(12) United States Patent
Perry et al.

(10) Patent No.: US 9,205,383 B2
(45) Date of Patent: Dec. 8, 2015

(54) SOLVENT AND ACID STABLE MEMBRANES, METHODS OF MANUFACTURE THEREOF AND METHODS OF USE THEREOF INTER ALIA FOR SEPARATING METAL IONS FROM LIQUID PROCESS STREAMS

(75) Inventors: Mordechai Perry, Petach Tikva (IL); Vera Ginzburg, Rehovot (IL); Boris Ginzburg, Rehovot (IL); Polina Lapido, Rishon Le Zion (IL)

(73) Assignee: AMS TECHNOLOGIES INT. (2012) LTD, Or-Yehuda (IL)

( * ) Notice: Subject to any disclaimer, the term of this patent is extended or adjusted under 35 U.S.C. 154(b) by 1124 days.

(21) Appl. No.: 13/144,116

(22) PCT Filed: Jan. 13, 2010
(Under 37 CFR 1.47)

(86) PCT No.: PCT/IL2010/000032
§ 371 (c)(1),
(2), (4) Date: Jan. 17, 2012

(87) PCT Pub. No.: WO2010/082194
PCT Pub. Date: Jul. 22, 2010

(65) Prior Publication Data
US 2012/0273421 A1    Nov. 1, 2012

Related U.S. Application Data

(60) Provisional application No. 61/193,962, filed on Jan. 13, 2009, provisional application No. 61/144,459, filed on Jan. 14, 2009.

(51) Int. Cl.
*B01D 71/42* (2006.01)
*B01D 71/60* (2006.01)
(Continued)

(52) U.S. Cl.
CPC .............. *B01D 71/42* (2013.01); *B01D 61/027* (2013.01); *B01D 61/145* (2013.01); *B01D 63/066* (2013.01); *B01D 67/0006* (2013.01); *B01D 67/0083* (2013.01); *B01D 67/0093* (2013.01);
(Continued)

(58) Field of Classification Search
None
See application file for complete search history.

(56) References Cited

U.S. PATENT DOCUMENTS

| 4,014,798 A | 3/1977 | Rembaum |
| 4,214,020 A | 7/1980 | Ward et al. |

(Continued)

FOREIGN PATENT DOCUMENTS

| CN | 1207956 A | 2/1999 |
| EP | 0061610 A1 | 10/1982 |

(Continued)

OTHER PUBLICATIONS

International Preliminary Report on Patentability dated Jul. 19, 2011 issued during prosecution of PCT/IL2010/000032.
(Continued)

*Primary Examiner* — Krishnan S Menon

(57) ABSTRACT

Solvent and acid stable ultrafiltration and nanofiltration membranes including a non-cross-linked base polymer having reactive pendant moieties, the base polymer being modified by forming a cross-linked skin onto a surface thereof, the skin being formed by a cross-linking reaction of reactive pendant moieties on the surface with an oligomer or another polymer as well as methods of manufacture and use thereof, including, inter alia separating metal ions from liquid process streams.

27 Claims, 7 Drawing Sheets

(51) Int. Cl.
    *B01D 71/66*     (2006.01)
    *B01D 61/02*     (2006.01)
    *B01D 61/14*     (2006.01)
    *B01D 63/06*     (2006.01)
    *B01D 67/00*     (2006.01)
    *B01D 69/02*     (2006.01)
    *B01D 69/12*     (2006.01)
    *B01D 71/68*     (2006.01)

(52) U.S. Cl.
    CPC ............ *B01D 67/0095* (2013.01); *B01D 69/02* (2013.01); *B01D 69/125* (2013.01); *B01D 71/60* (2013.01); *B01D 71/68* (2013.01); *B01D 2323/30* (2013.01); *B01D 2323/36* (2013.01); *B01D 2323/38* (2013.01); *B01D 2323/40* (2013.01); *B01D 2325/20* (2013.01); *B01D 2325/30* (2013.01)

(56) References Cited

U.S. PATENT DOCUMENTS

| | | |
|---|---|---|
| 4,238,306 A | 12/1980 | Perry et al. |
| 4,238,307 A | 12/1980 | Perry et al. |
| 4,246,092 A | 1/1981 | Perry et al. |
| 4,477,634 A | 10/1984 | Linder et al. |
| 4,517,353 A | 5/1985 | Zecher et al. |
| 4,584,103 A | 4/1986 | Linder et al. |
| 4,604,204 A | 8/1986 | Linder et al. |
| 4,659,474 A | 4/1987 | Perry et al. |
| 4,690,765 A | 9/1987 | Linder et al. |
| 4,690,766 A | 9/1987 | Linder et al. |
| 4,704,324 A | 11/1987 | Davis et al. |
| 4,720,345 A | 1/1988 | Linder et al. |
| 4,753,725 A | 6/1988 | Linder et al. |
| 4,767,645 A | 8/1988 | Linder et al. |
| 4,778,596 A | 10/1988 | Linder et al. |
| 4,833,014 A | 5/1989 | Linder et al. |
| 4,889,636 A | 12/1989 | Perry et al. |
| 4,894,159 A | 1/1990 | Guiver et al. |
| 4,911,844 A | 3/1990 | Linder et al. |
| 4,952,220 A | 8/1990 | Langsam et al. |
| 5,024,765 A | 6/1991 | Linder et al. |
| 5,028,337 A | 7/1991 | Linder et al. |
| 5,032,282 A | 7/1991 | Linder et al. |
| 5,039,421 A | 8/1991 | Linder et al. |
| 5,049,282 A | 9/1991 | Linder et al. |
| 5,057,197 A | 10/1991 | Perry et al. |
| 5,067,970 A | 11/1991 | Wang et al. |
| 5,087,338 A | 2/1992 | Perry et al. |
| 5,116,511 A | 5/1992 | Green et al. |
| 5,151,182 A | 9/1992 | Perry et al. |
| 5,152,901 A | 10/1992 | Hodgdon |
| 5,158,683 A | 10/1992 | Lin |
| 5,205,934 A | 4/1993 | Linder et al. |
| 5,265,734 A | 11/1993 | Linder et al. |
| 5,272,657 A | 12/1993 | Basehore et al. |
| 5,282,971 A | 2/1994 | Degen et al. |
| 5,304,307 A | 4/1994 | Linder et al. |
| 5,310,486 A | 5/1994 | Green et al. |
| 5,430,099 A | 7/1995 | Linder et al. |
| 5,458,781 A | 10/1995 | Lin |
| 5,476,591 A | 12/1995 | Green |
| 5,547,579 A | 8/1996 | Brown |
| 5,587,083 A | 12/1996 | Twardowski |
| 5,597,863 A | 1/1997 | Linder et al. |
| 5,599,506 A | 2/1997 | Linder et al. |
| 5,733,431 A | 3/1998 | Green et al. |
| 5,858,240 A | 1/1999 | Twardowski et al. |
| 5,945,000 A | 8/1999 | Skidmore et al. |
| 5,961,833 A | 10/1999 | Green et al. |
| 6,086,764 A | 7/2000 | Linder et al. |
| 6,132,804 A | 10/2000 | Rice et al. |
| 6,156,186 A | 12/2000 | Mueller et al. |
| 6,159,370 A | 12/2000 | Hicke et al. |
| 6,165,344 A | 12/2000 | Green et al. |
| 6,355,175 B1 | 3/2002 | Green et al. |
| 6,536,605 B2 | 3/2003 | Rice et al. |
| 6,733,653 B2 | 5/2004 | Jangbarwala |
| 6,827,856 B2 | 12/2004 | Desantis et al. |
| 6,835,295 B1 | 12/2004 | Jangbarwala |
| 6,843,917 B1 | 1/2005 | Guy et al. |
| 7,077,953 B2 | 7/2006 | Ranney |
| 7,138,058 B2 | 11/2006 | Kurth et al. |
| 2003/0089619 A1 | 5/2003 | Jayasekera et al. |
| 2003/0121857 A1 | 7/2003 | Kurth et al. |
| 2007/0125198 A1 | 6/2007 | Rossiter |
| 2008/0000809 A1 | 1/2008 | Wang et al. |
| 2008/0069748 A1 | 3/2008 | Lien et al. |
| 2009/0101583 A1 | 4/2009 | Perry |

FOREIGN PATENT DOCUMENTS

| | | |
|---|---|---|
| EP | 0061610 B1 | 11/1986 |
| EP | 0392982 A2 | 10/1990 |
| EP | 0 422 506 A1 | 4/1991 |
| EP | 0427452 A2 | 5/1991 |
| EP | 0 574 957 A2 | 12/1993 |
| EP | 0392982 B1 | 12/1994 |
| EP | 0427452 B1 | 3/1995 |
| EP | 0884096 A1 | 12/1998 |
| EP | 0884096 B1 | 9/2005 |
| WO | 94/27711 A1 | 12/1994 |
| WO | 95/30471 A1 | 11/1995 |
| WO | 99/23263 A1 | 5/1999 |
| WO | 99/40996 A1 | 8/1999 |
| WO | WO9940996 A1 | 8/1999 |
| WO | WO9947247 A1 | 9/1999 |
| WO | 00/50341 A1 | 8/2000 |
| WO | 03/035934 A1 | 5/2003 |
| WO | 2010/082194 A2 | 7/2010 |

OTHER PUBLICATIONS

International Search Report and Written Opinion dated Jul. 9, 2010 issued during prosecution of PCT/IL2010/000032.

F. Eloy et al; The Chemistry of Amidoximes and Related Compounds; Chem, Rev., 62, p. 155-183, Apr. 1962.

H. Schonhorn, et al; "Adhesive bonding of polyvinylidene fluoride: Effect of curing agent in $PVF_2$ surface modification", Journal of Adhesion Science and Technology, vol. 3, No. 1, (1989).

A. Taguet, et al; "Crosslinking of Vinylidene Fluoride-Containing Fluoropolymers", Advances in Polymer Science; (2005), vol. 184/2005, pp. 127-211.

J.G. Wijmans, et al; "The solution-diffusion model: a review", Journal of Membrane Science 107, Issues 1-2, Nov. 15, 1995; pp. 1-21.

Samantha Platt, et al; "Stability of NF membranes under extreme acidic conditions", Journal of Membrance Science, vol. 239, Issue 1, Aug. 1, 2004, pp. 91-103.

A. Warshawsky, et al; "Halomethylated Polysulfone: Reactive Intermediates to Neutral and Ionic Film-Forming Polymers", Journal of Polymer Science, Part A: Polymer Chemistry; vol. 28, Issue 11, Oct. 1990; pp. 2885-2905.

A. Noshay, et al; "Sulfonated Polysulfone", Journal of Applied Polymer Science; vol. 20, Issue 7, pp. 1885-1903; Jul. 1976.

Michael D. Guiver, et al; "Functional Group Polysulphones by Bromination-Metalation", Polymer; vol. 30, Jun. 1989; pp. 1137-1142.

Qing Shi, et al; "Zwitterionic polyethersulfone ultrafiltration membrane with superior antifouling property", Journal of Membrane Science; vol. 319, Issues 1-2; Jul. 2008; pp. 271-278.

K. Scott; "Membrane Materials, Preparation and Characterisation", Handbook of Industrial Membranes; ©1995 Elsevier Publishers, Section 2.1, pp. 187-269.

Marcel Mulder; "VIII Module and Process Design", Basic Principles of Membrane Technology Second Edition; Kluwer Academic Publishers; 1996; pp. 465-473.

(56) References Cited

OTHER PUBLICATIONS

Book—"Membranes for Industrial Wastewater Recovery and Re-Use", Edited by Simon Judd and Bruce Jefferson; © 2003 Elsevier, Chapter 2.

Li-Ping Zhu, et al; "Corona-induced graft polymerization for surface modifications of porous polyethersulfone membranes", Applied Surface Science, vol. 253, Issue 14, May 15, 2007; pp. 6052-6059.

N. Kahana, et al; "Functional Macrocyclic Polysulfones via Aminomethylpolysulfone", Journal of Polymer Science: Part A: Polymer Chemistry, vol. 28; Issue 12, Nov. 1990; pp. 3185-3532.

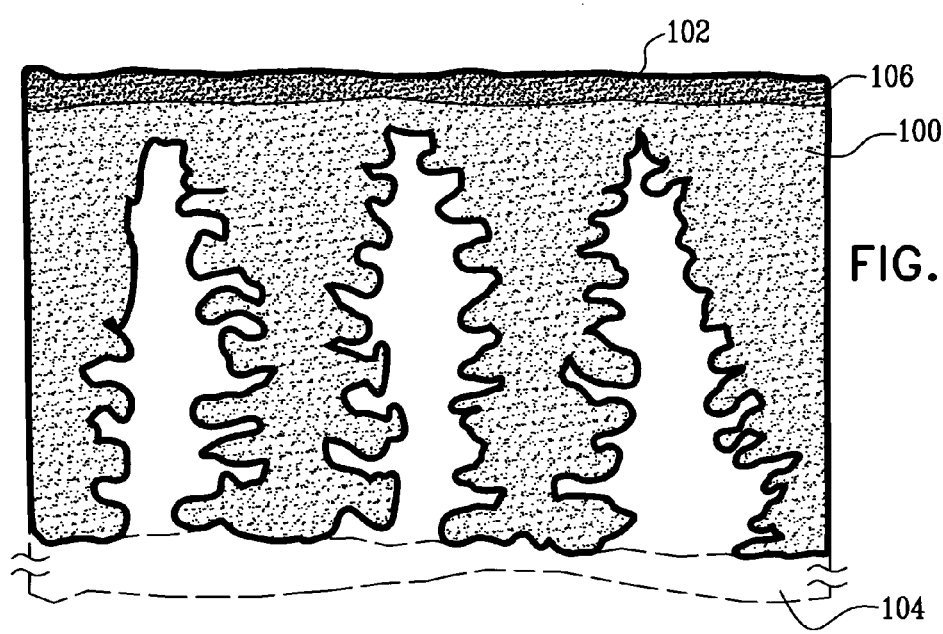
FIG. 1
FIG. 2A
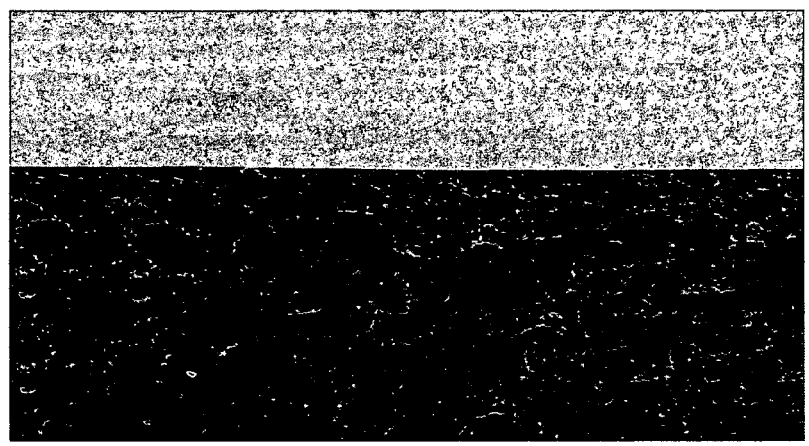
FIG. 2B
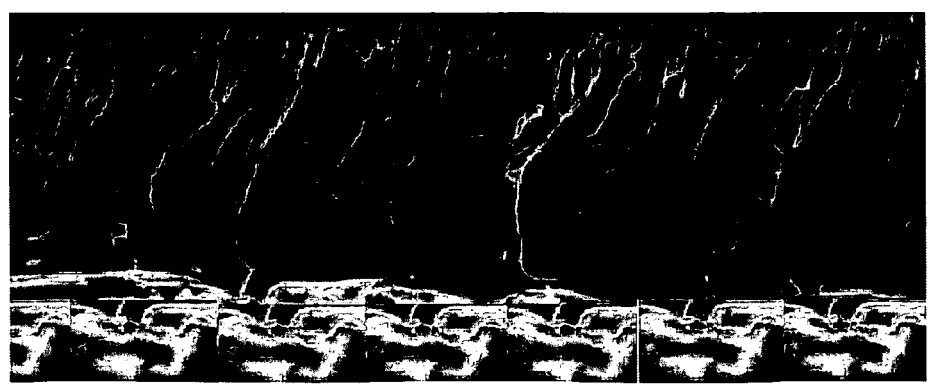

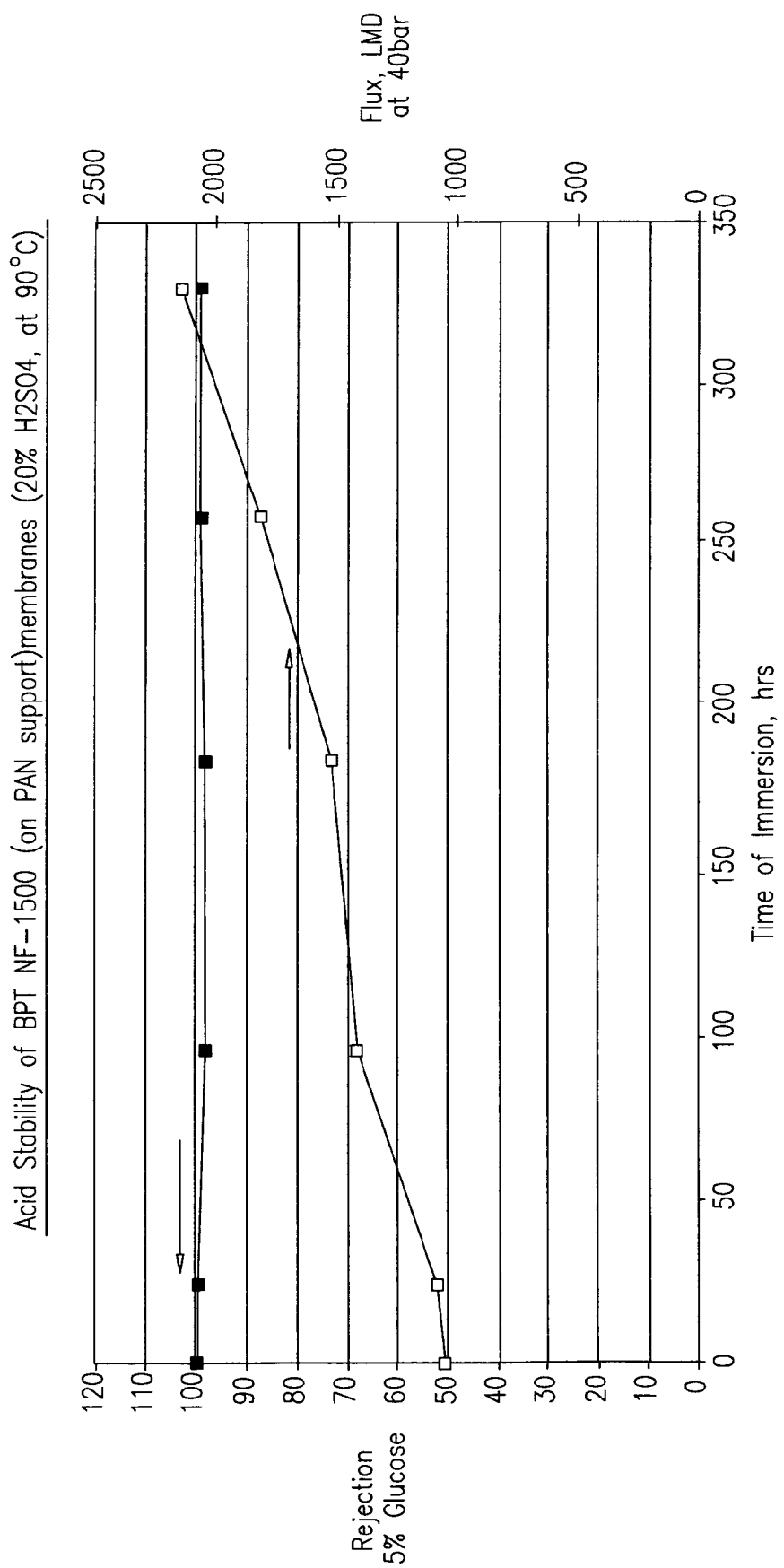

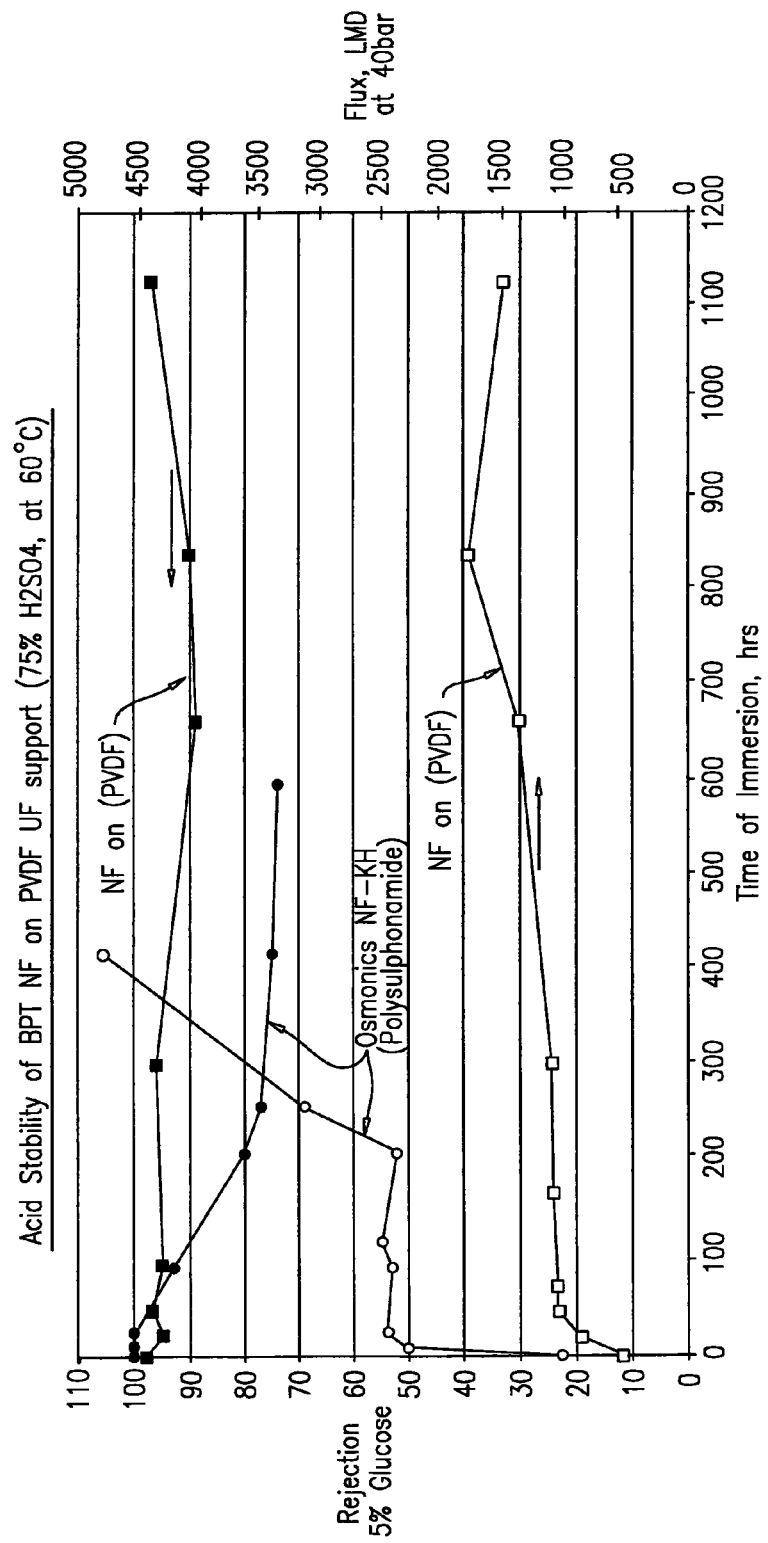

SOLVENT AND ACID STABLE MEMBRANES, METHODS OF MANUFACTURE THEREOF AND METHODS OF USE THEREOF INTER ALIA FOR SEPARATING METAL IONS FROM LIQUID PROCESS STREAMS

CROSS REFERENCE TO RELATED APPLICATIONS

Reference is made to U.S. Provisional Patent Application Ser. No. 61/193,962, filed Jan. 13, 2009 and entitled "MODIFIED SOLVENT STABLE MEMBRANES HAVING IMPROVED PROPERTIES" and to U.S. Provisional Patent Application Ser. No. 61/144,459, filed Jan. 14, 2009 and entitled "METHOD FOR SEPARATING METAL IONS FROM LIQUID PROCESS STREAMS" the disclosures of which are hereby incorporated by reference and priority of which is hereby claimed pursuant to 37 CFR 1.78(a) (4) and (5)(i).

FIELD OF THE INVENTION

The present invention relates to membranes having enhanced solvent and acid stability, methods of manufacture thereof and methods of use thereof.

BACKGROUND OF THE INVENTION

The following documents, the contents of which are hereby incorporated by reference, are believed to represent the current state of the art:

U.S. Pat. Nos. 4,014,798; 4,214,020; 4,238,306; 4,238,307; 4,246,092; 4,477,634; 4,517,353; 4,584,103; 4,604,204; 4,659,474; 4,690,765; 4,690,766; 4,704,324; 4,720,345; 4,753,725; 4,767,645; 4,778,596; 4,833,014; 4,889,636; 4,894,159; 4,911,844; 4,952,220; 5,024,765; 5,028,337; 5,032,282; 5,039,421; 5,049,282; 5,057,197; 5,067,970; 5,087,338; 5,116,511; 5,151,182; 5,152,901; 5,158,683; 5,205,934; 5,265,734; 5,272,657; 5,282,971; 5,304,307; 5,310,486; 5,430,099; 5,458,781; 5,476,591; 5,547,579; 5,587,083; 5,597,863; 5,599,506; 5,733,431; 5,858,240; 5,945,000; 5,961,833; 6,086,764; 6,132,804; 6,156,186; 6,159,370; 6,165,344; 6,355,175; 6,536,605; 6,733,653; 6,827,856; 6,835,295; 6,843,917; 7,077,953 and 7,138,058.

U.S. Patent Publication Nos. 2003/0089619; 2007/0125198; 2008/0000809; 2008/0069748 and 2009/0101583.

European Patent Nos. 0 422 506 and 0 574 957.

Published PCT Application Nos. WO 94/27711, 95/30471, 99/23263, 99/40996, 00/50341, and 03/35934.

"The Chemistry of the Cyano Group", F. C. Schaefer ed. Z. Rappoport, Interscience, New York, chapter 6, p. 239-305, (1970).

"The Chemistry of Amidoximes and Related Compounds", F. Eloy and R. Lenaers, Chem. Rev., 62, p. 155, (1962).

H. Schonhorn and J. P. Luongo, J. Adhesion Sci. Technol., Vol. 3, N4, pp. 227-290, (1989).

A. Taguet, B. Ameduri and B. Boutevin, J. Adv. Polym. Sci., 184, p. 127-211 (2005).

The Solution Diffusion Model: A Review, J. G. Wijmans, R. W. Baker, J. Membrane Science, 1995, vol. 107, pp. 1-21.

Platt et al., J. Membrane Science 239 (2004) 91-103.

A. Warshawsky et al., J. of Polymer Sci., Part A: Polymer Chemistry, Vol. 28, p. 2885, pp 3303-3315 (1990).

A. Noshay and L. M. Robertson, J. Appl. Polym. Sci., Vol. 20, p. 1885 (1976).

M. D. Guiver, O. Kutowy and J. W. A. Simon, Polymer, 30, p. 1137 (1989).

Quing Shi et al. J. of Membrane Sci., 319, p. 271 (2008).

"Handbook of Industrial Membranes", K. Scott, Elsevier Publishers, section 2.1, pp. 187-269.

"Basic principles of membrane technology", M. Mulder, pp. 465-473 (1996).

"Membranes for industrial wastewater recovery and reuse", Simon Judd & Bruce Jefferson (eds), Elsevier, Chapter 2 (2003)

Applied Surface Science, 253, Issue 14, 2007, pp. 6052-6059, You-Yi Xu et al.

SUMMARY OF THE INVENTION

The present invention seeks to provide membranes having enhanced solvent and acid stability, methods of manufacture thereof and methods of use thereof.

There is thus provided in accordance with a preferred embodiment of the present invention a polymeric semipermeable membrane including a non-cross-linked base polymer having reactive pendant moieties, the base polymer being modified by forming a cross-linked skin onto a surface thereof, the skin being formed by a cross-linking reaction of reactive pendant moieties on the surface with an oligomer or another polymer.

Preferably, the polymeric semipermeable membrane also includes a substrate underlying the base polymer. Additionally, the substrate is a woven or non-woven textile substrate.

In accordance with a preferred embodiment of the present invention the membrane is free-standing.

Preferably, the cross-linked skin is hydrophilic. Alternatively, the cross-linked skin is hydrophobic.

In accordance with a preferred embodiment of the present invention the surface is a top surface of the base polymer. Alternatively, the surface includes a top surface of the base polymer and other exposed surfaces of the base polymer.

Preferably, the polymeric semipermeable membrane also includes a nanofiltration layer formed over at least a portion of the cross-linked skin. Additionally, the nanofiltration layer is covalently bonded to the cross-linked skin.

In accordance with a preferred embodiment of the present invention the reactive pendant moieties are a species selected from the group consisting of halogen and nitrile.

Preferably, the reactive pendant moieties are intrinsic to the base polymer. Additionally, the base polymer is selected from the group consisting of polyvinylidene fluoride, acrylonitrile polymer and copolymers thereof. Additionally, the base polymer includes polyacrylonitrile.

In accordance with a preferred embodiment of the present invention the reactive pendant moieties are added to the outer surface of the base polymer by a chemical process. Preferably, the base polymer is a polymer including a plurality of repeating sulfone groups. Additionally, the base polymer is selected from polysulfones, polyether sulfones and polyphenylene sulfones. Most preferably, the base polymer is polyether sulfone.

In accordance with a preferred embodiment of the present invention the chemical process is an oxidation reaction. Preferably, the oxidation reaction is an ozonation reaction. Alternatively, the chemical process is a chlorosulfonation reaction. Preferably, the chlorosulfonation reaction is carried out in a solvent including glacial acetic acid or a mixture of acetic acid with at least one non-polar solvent.

Preferably, the another polymer is selected from polyethylenimine and polyvinyl alcohol. More preferably, the another polymer is polyethylenimine.

In accordance with a preferred embodiment of the present invention the polymeric semipermeable membrane is an ultrafiltration membrane or a microfiltration membrane.

Preferably, the cross-linking reaction is effected at elevated temperature utilizing a solution of the oligomer or another polymer, optionally followed by a drying step at elevated temperature. Additionally, the drying step is effected by air drying at elevated temperature.

In accordance with a preferred embodiment of the present invention the polymeric semipermeable membrane is a polyacrylonitrile ultrafiltration membrane and the another polymer is polyethylenimine. Alternatively, the polymeric semipermeable membrane is a polyvinylidene fluoride ultrafiltration membrane and the another polymer is polyethylenimine.

Preferably, the polymeric semipermeable membrane is characterized by having improved stability compared to the non-modified membrane in an aggressive environment including at least one of the group consisting of acid media, basic media, organic solvents, oxidizing species, elevated temperatures and elevated pressure. Additionally, the aggressive environment includes at least one organic solvent in which the non-modified membrane dissolves or is damaged.

There is also provided in accordance with another preferred embodiment of the present invention a method of forming a polymeric semipermeable membrane including providing a non-cross-linked base polymer having reactive pendant moieties and effecting a cross-linking reaction between the reactive pendant moieties on a surface of the base polymer with an oligomer or another polymer, thereby forming a cross-linked skin on the surface of the base polymer.

Preferably, the surface is a top surface of the base polymer. Additionally or alternatively, the surface includes a top surface of the base polymer and other exposed surfaces of the base polymer.

In accordance with a preferred embodiment of the present invention the method further includes forming a nanofiltration layer over at least a portion of the cross-linked skin. Additionally, the forming includes covalently bonding the nanofiltration layer to the cross-linked skin.

Preferably, the reactive pendant moieties are a species selected from the group consisting of halogen and nitrile.

In accordance with a preferred embodiment of the present invention the base polymer is selected from the group consisting of polyvinylidene fluoride, acrylonitrile polymer and copolymers thereof. Preferably, the base polymer includes polyacrylonitrile.

In accordance with a preferred embodiment of the present invention the method also includes adding reactive pendant moieties to the outer surface of the base polymer by a chemical process in order to provide the non-cross-linked base polymer having reactive pendant moieties. Preferably, the base polymer is selected from polysulfones, polyether sulfones and polyphenylene sulfones. More preferably, the base polymer is polyether sulfone.

In accordance with a preferred embodiment of the present invention the chemical process is an oxidation reaction. More preferably, the oxidation reaction is an ozonation reaction. Alternatively, the chemical process is a chlorosulfonation reaction. Preferably, the chlorosulfonation reaction is carried out in a solvent including glacial acetic acid or a mixture of acetic acid with at least one non-polar solvent.

Preferably, the another polymer is selected from polyethylenimine and polyvinyl alcohol. More preferably, the another polymer is polyethylenimine.

In accordance with a preferred embodiment of the present invention the cross-linking reaction is effected at a first elevated temperature utilizing a solution of the oligomer or another polymer.

Preferably, the first elevated temperature is in the range of 50-100° C. More preferably, the first elevated temperature is in the range of 70-90° C.

Preferably, the cross-linking reaction is carried out for 5-32 hours. More preferably, the cross-linking reaction is carried out for 10-20 hours.

Preferably, the concentration of the oligomer or another polymer in the solution is in the range of 2-10%. More preferably, the concentration of the oligomer or another polymer in the solution is 4%.

In accordance with a preferred embodiment of the present invention the method is followed by a drying step at a second elevated temperature. Preferably, the second elevated temperature is in the range of 70-120° C. Preferably, the drying step is effected by air drying.

In accordance with a preferred embodiment of the present invention the cross-linking reaction includes reacting amine groups with nitrile groups to form amidine groups. Preferably, the polymeric semipermeable membrane is a polyacrylonitrile ultrafiltration membrane and the another polymer is polyethylenimine.

Preferably, the cross-linking reaction includes reacting primary and secondary amino groups with halocarbon groups to form imine and tertiary amino groups. Preferably, the polymeric semipermeable membrane is a polyvinylidene fluoride ultrafiltration membrane and the another polymer is polyethylenimine.

There is provided, in accordance with an embodiment of the invention, a method for separating a metal from a metal-containing liquid stream, the liquid stream being acidic, basic or organic solvent-based, the method including providing a nanofiltration membrane for which at least one of the following (a), (b), (c)(i), (c)(ii) and (c)(iii) is true:

(a) the nanofiltration membrane contains a matrix that has been formed from
  (i) at least one di-, tri- or tetra-halo substituted diazine or triazine-containing monomer, oligomer or polymer, and
  (ii) at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl;

(b) the nanofiltration membrane is a composite nanofiltration membrane which contains a matrix that is covalently bound to an underlying UF support membrane;

(c)(i) after exposure of the nanofiltration membrane to 75% sulfuric acid at 60° C. for 300 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.;

(c)(ii) after exposure of the nanofiltration membrane to 20% sulfuric acid at 90° C. for 180 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.;

(c)(iii) after exposure of the nanofiltration membrane to 20% sulfuric acid at 45° C. for 60 days, the nanofiltration membrane removes at least 70% of the copper ions at a flux greater than 1 gfd from a feed solution of 8.5% CuSO$_4$ in 20% sulfuric acid when the feed solution is applied to the membrane at a feed pressure of 600 psig and a temperature of 25° C.;

and permeating at least a portion of the metal-containing liquid stream through the nanofiltration membrane, whereby to obtain a permeate which is reduced in the metal relative to the metal-containing liquid stream.

In some embodiments, the liquid stream is an acidic metal-containing liquid stream. In some embodiments, the liquid stream is a basic metal-containing liquid stream. In some embodiments, the liquid stream is an organic solvent-based metal-containing liquid stream.

In some embodiments, the metal is copper. In some embodiments, the copper is in the form of a divalent ion.

In some embodiments, (a) is true. In some embodiments, (b) is true. In some embodiments, both (a) and (b) are true. In some embodiments, both (a) and at least one of (c)(i), (c)(ii) and (c)(iii) are true. In some embodiments, both (b) and at least one of (c) (i), (c)(ii) and (c)(iii) are true. In some embodiments, (a), (b) and at least one of (c)(i), (c)(ii) and (c)(iii) are true. In some embodiments, (c)(i) is true. In some embodiments, (c)(ii) is true. In some embodiments, (c)(iii) is true.

In some embodiments, the matrix has been formed on an underlying ultrafiltration or microfiltration membrane. In some embodiments, the underlying UF or MF membrane is not a polyethersulfone membrane. In some embodiments, the underlying UF or MF membrane is not a polysulfone membrane. In some embodiments, the underlying UF or MF membrane is not a polyvinylidene fluoride membrane. In some embodiments the underlying membrane is a UF membrane that is covalently attached to a support. In some embodiments the support is a non-woven support. In some embodiments, the matrix is covalently bound to the underlying UF or MF membrane.

In some embodiments, after the exposure the flux under the recited conditions is at least 6 gfd.

In some embodiments, after exposure of the NF membrane to 75% sulfuric acid at 60° C. for 1000 hours, the membrane exhibits a glucose rejection of at least 95% at a flux of at least 10 gfd.

In some embodiments, after the exposure at least 80% of the copper ions are removed under the conditions recited. In some embodiments, at least 90% of the copper ions are removed under the conditions recited.

In some embodiments, the halo-substituted diazine or triazine-containing monomer or oligomer is selected from the group consisting of:

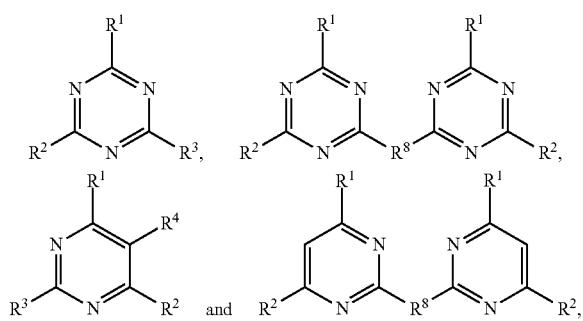

wherein:
$R^1$ is independently selected at each occurrence from bromo, chloro, iodo, fluoro, —NHR$^5$, —OR$^5$ and SR$^5$, wherein R$^5$ is independently selected at each occurrence from H, optionally substituted alkyl and optionally substituted aryl;

$R^2$ is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;

$R^3$ is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;

$R^4$ is selected from H, bromo, chloro, fluoro, —NHR$^5$, —OR$^5$ and SR$^5$, wherein $R^5$ is independently selected at each occurrence from H, optionally substituted alkyl and optionally substituted aryl; and $R^8$ is independently selected at each occurrence from —NH$_2$— and —NH-A-NH—, wherein A is selected from C$_{1-20}$ aliphatic moieties, C$_{6-10}$ aromatic moieties, and combinations thereof;

provided that at at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

In some embodiments, the multifunctional amine has a molecular weight of in the range of 400 to 750,000.

In some embodiments, the matrix is formed by a process which includes providing an asymmetric base ultrafiltration membrane which at one face thereof has pores of smaller diameter than at the opposite face; providing a solution containing at least one di-, tri- or tetra-halo substituted diazine or triazine-containing monomer, oligomer or polymer, at least one multifunctional amine having a molecular weight in the range of 400 to 750,000, and optionally, at least one supplemental cross-linker; and bringing the solution into contact with the face of the ultrafiltration membrane having smaller pores under superatmospheric pressure for a time sufficient to effect covalent bonding of the at least one di- or tri-halo substituted diazine or triazine-containing monomer, oligomer or polymer and the at least one multi-functional amine. In some embodiments, the time and pressure are sufficient to effect covalent bonding at of the least one di- or tri-halo substituted diazine or triazine-containing monomer, oligomer or polymer, the at least one multi-functional amine, and the surface of the pores of the ultrafiltration membrane. In some embodiments, prior to the contacting, the ultrafiltration membrane has been modified to facilitate covalent bonding to the surface thereof. In some embodiments, prior to the contacting, the ultrafiltration membrane has been modified by forming a cross-linked ultrafiltration matrix on the surface thereof, on which the NF matrix is then formed. In some embodiments, the formation of the nanofiltration membrane further includes, after the contacting, heating the ultrafiltration membrane. In some embodiments, the multifunctional amine is selected from the group consisting of polyethylenimine, polyvinylamine, polyvinylanilines, polybenzylamines, polyvinylimidazolines, and amine-modified polyepihalohydrins. In some embodiments, the supplemental cross-linker is selected from the group consisting of 2,4,6-trichloro-s-triazine, 4,6-dichloro-2-sodium p-sulfoanile-s-triazine (4,6-dichloro-2-p-anilinesulfonic acid sodium salt-s-triazine), 4,6-dichloro-2-diethanolamine-s-triazine and 4,6-dichloro-2-amino-s-triazine.

In some embodiments the matrix is covalently bound to the underlying support membrane.

In some embodiments the matrix is attached to an underlying UF support membrane which has been prepared as described in co-pending U.S. Provisional Patent Application No. 61/193,962.

In some embodiments, the matrix includes cationic functional groups.

In some embodiments, the matrix has a density of from about 0.5 g per $cm^3$ to about 2.0 g per $cm^3$. In some embodiments, the matrix has a density of from about 0.7 $g/cm^3$ to about 1.7 $g/cm^3$. In some embodiments, the matrix has a density of from about 0.8 $g/cm^3$ to about 1.6 $g/cm^3$. In some embodiments, the mass to area ratio of the matrix is from about 20 to about 200 $mg/m^2$. In some embodiments, the mass to area ratio of the matrix is from about 30 to about 150 $mg/m^2$.

In some embodiments, the method further includes recovering the metal which has been separated from the acidic metal-containing liquid stream.

In some embodiments, the method further includes forming the acidic metal-containing liquid stream by providing a metal containing ore and leaching metal from the ore by contacting the ore with an acidic liquid. In some embodiments, the acidic liquid is sulfuric acid.

There is also provided, in accordance with an embodiment of the invention, a metal which has been separated from a metal-containing liquid stream by a method in accordance with embodiments of the invention.

There is also provided, in accordance with an embodiment of the invention, an apparatus for separating a metal from a metal-containing liquid stream, the liquid stream being acidic, basic or organic solvent-based, the apparatus including a nanofiltration membrane for which at least one of the following (a), (b), (c)(i), (c)(ii) and (c)(iii) is true:

(a) the nanofiltration membrane contains a matrix that has been formed from
  (i) at least one di-, tri- or tetra-halo substituted diazine or triazine-containing monomer, oligomer or polymer, and
  (ii) at least one multifunctional amine having a molecular weight in the range of 400 to 750,000, provided that at least one of the di- or tri-halo substituted diazine or triazine-containing monomer, oligomer or polymer is not a di- or triazine monomer which is substituted only by Cl;
(b) the nanofiltration membrane is a composite nanofiltration membrane which contains a matrix that is covalently bound to an underlying UF support membrane;
(c)(i) after exposure of the nanofiltration membrane to 75% sulfuric acid at 60° C. for 300 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.;
(c)(ii) after exposure of the nanofiltration membrane to 20% sulfuric acid at 90° C. for 180 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.;
(c)(iii) after exposure of the nanofiltration membrane to 20% sulfuric acid at 45° C. for 60 days, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.

In some embodiments, (a) is true. In some embodiments, (b) is true. In some embodiments, both (a) and (b) are true. In some embodiments, both (a) and at least one of (c)(i), (c)(ii) and (c)(iii) are true. In some embodiments, both (b) and at least one of (c)(i), (c)(ii) and (c)(iii) are true. In some embodiments, (a), (b) and at least one of (c)(i), (c)(ii) and (c)(iii) are true. In some embodiments, (c)(i) is true. In some embodiments, (c)(ii) is true. In some embodiments, (c)(iii) is true.

In some embodiments, the apparatus further includes a housing which houses the nanofiltration membrane. In some embodiments, the housing includes at least one inlet port and at least one outlet port. In some embodiments, the housing includes at least two outlet ports. In some embodiments, the at least two outlet ports are separated such that one of the at least two outlet ports is in fluid communication with the permeate stream that exits the membrane and the other of the at least two outlet ports is in fluid communication with the retentate stream that is retained by the membrane.

In some embodiments, the matrix has been formed on an underlying ultrafiltration or microfiltration membrane. In some embodiments, the underlying UF or MF membrane is not a polyethersulfone membrane. In some embodiments, the underlying UF or MF membrane is not a polysulfone membrane. In some embodiments, the underlying UF or MF membrane is not a polyvinylidene fluoride membrane. In some embodiments, the matrix is covalently bound to the underlying UF or MF membrane.

In some embodiments, after the exposure the flux under the recited conditions is at least 6 gfd.

In some embodiments, after exposure of the NF membrane to 75% sulfuric acid at 60° C. for 1000 hours, the membrane exhibits a glucose rejection of at least 95% at a flux of at least 10 gfd.

In some embodiments, the di-, tri- or tetra-halo substituted diazine or triazine-containing monomer or oligomer is selected from the group consisting of:

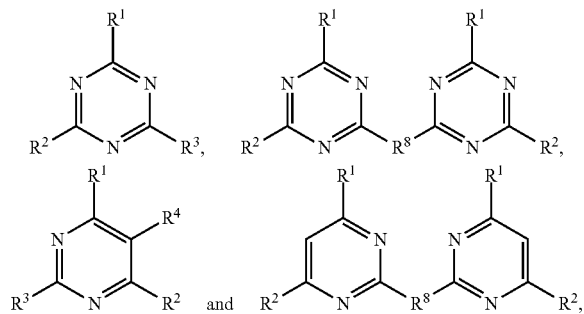

wherein:
$R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;
$R^2$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;
$R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;
$R^4$ is selected from H, bromo, chloro, fluoro, —$NHR^5$, —$OR^5$ and $SR^5$, wherein $R^5$ is independently selected at each occurrence from H, optionally substituted alkyl and optionally substituted aryl; and $R^8$ is independently selected at each occurrence from —$NH_2$— and —NH-A-NH—, wherein A is selected from $C_{1-20}$ aliphatic moieties, $C_{6-10}$ aromatic moieties, and combinations thereof;

provided that at at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

In some embodiments, the matrix is formed by a process which includes providing an asymmetric base ultrafiltration membrane which at one face thereof has pores of smaller diameter than at the opposite face; providing a solution containing at least one di- or tri-halo substituted diazine or triazine-containing monomer or oligomer, at least one multifunctional amine having a molecular weight in the range of 400 to 750,000, and optionally, at least one supplemental cross-linker; and bringing the solution into contact with the face of the ultrafiltration membrane having smaller pores under superatmospheric pressure for a time sufficient to effect covalent bonding of the at least one di- or tri-halo substituted diazine or triazine-containing monomer or oligomer and the at least one multi-functional amine. In some embodiments, the time and pressure are sufficient to effect covalent bonding at of the least one di- or tri-halo substituted diazine or triazine-containing monomer or oligomer, the at least one multi-functional amine, and the surface of the pores of the ultrafiltration membrane. In some embodiments, prior to the contacting, the ultrafiltration membrane has been modified to facilitate covalent bonding to the surface thereof. In some embodiments, the formation of the nanofiltration membrane further includes, after the contacting, heating the ultrafiltration membrane. In some embodiments, the multifunctional amine is selected from the group consisting of polyethylenemine, polyvinylamine, polyvinylanilines, polybenzylamines, polyvinylimidazolines, and amine-modified polyepihalohydrins. In some embodiments, the supplemental cross-linker is selected from the group consisting of 2,4,6-trichloro-s-triazine, 4,6-dichloro-2-sodium p-sulfoanile-s-triazine (4,6-dichloro-2-p-anilinesulfonic acid sodium salt-s-triazine), 4,6-dichloro-2-diethanolamine-s-triazine and 4,6-dichloro-2-amino-s-triazine. In some embodiments, the matrix includes cationic functional groups.

There is also provided, in accordance with an embodiment of the invention, nanofiltration membrane of which at least one of the following (a), (b), (c)(i), (c)(ii) and (c)(iii) is true:

(a) the nanofiltration membrane contains a matrix that has been formed from
  (i) at least one di- or tri-halo substituted diazine or triazine-containing monomer, oligomer or polymer, and
  (ii) at least one multifunctional amine having a molecular weight in the range of 400 to 750,000, provided that at least one of the di- or tri-halo substituted diazine or triazine-containing monomer, oligomer or polymer is not a di- or triazine monomer which is substituted only by Cl;

(b) the nanofiltration membrane is a composite nanofiltration membrane which contains a matrix that is covalently bound to an underlying UF support;

(c)(i) after an exposure of the nanofiltration membrane to 75% sulfuric acid at 60° C. for 300 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.

(c)(ii) after exposure of the nanofiltration membrane to 20% sulfuric acid at 90° C. for 180 hours, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.;

(c)(iii) after exposure of the nanofiltration membrane to 20% sulfuric acid at 45° C. for 60 days, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.

In some embodiments, (a) is true. In some embodiments, (b) is true. In some embodiments, both (a) and (b) are true. In some embodiments, both (a) and at least one of (c)(i), (c)(ii) and (c)(iii) are true. In some embodiments, both (b) and at least one of (c)(i), (c)(ii) and (c)(iii) are true. In some embodiments, (a), (b) and at least one of (c)(i), (c)(ii) and (c)(iii) are true. In some embodiments, (c)(i) is true. In some embodiments, (c)(ii) is true. In some embodiments, (c)(iii) is true.

BRIEF DESCRIPTION OF THE DRAWINGS

The present invention will be understood and appreciated more fully from the following detailed description, taken in conjunction with the drawings in which:

FIG. 1 is a simplified illustration of an ultrafiltration membrane constructed and operative in accordance with an embodiment of the present invention;

FIG. 2A is a computer-enhanced photomicrograph of one example of the ultrafiltration membrane of FIG. 1;

FIG. 2B is a computer-enhanced photomicrograph of another example of the ultrafiltration membrane of FIG. 1;

FIGS. 8A and 8B are simplified illustrations showing the acid stability of two types of nanofiltration membranes constructed and operative in accordance with a preferred embodiment of the present invention.

DETAILED DESCRIPTION OF THE INVENTION

Figure 3A:
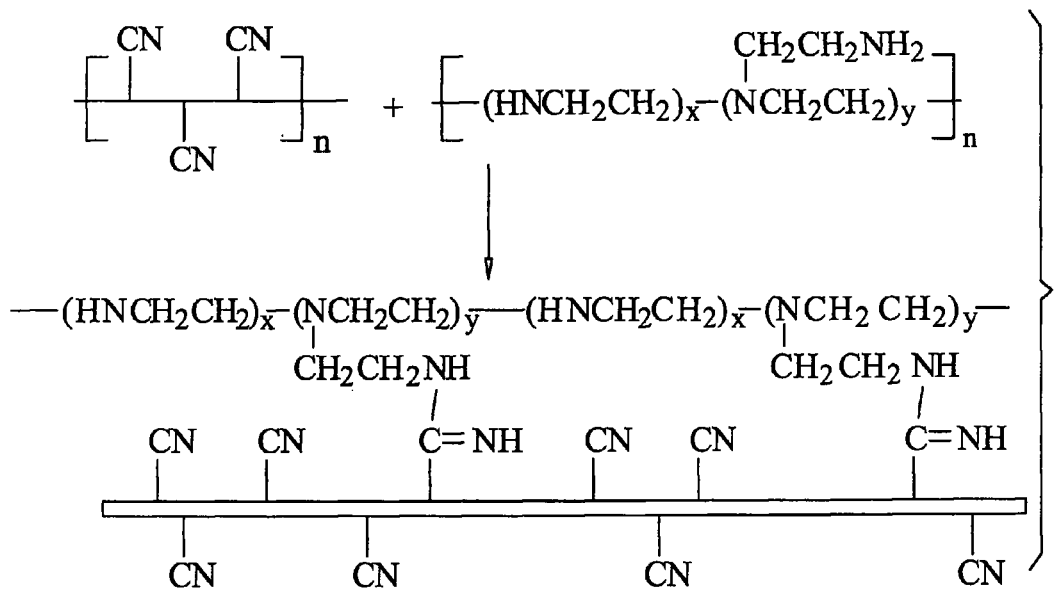
FIGS. 3A and 3B are simplified illustrations of chemical reactions which take place in the manufacture of the ultrafiltration membrane of FIG. 1 in accordance with one embodiment of the present invention and which produce covalent bonding.

Reference is now made to FIG. 1, which is a simplified illustration of an ultrafiltration membrane constructed and operative in accordance with an embodiment of the present invention. As illustrated in FIG. 1, there is provided a polymeric semipermeable membrane including a non-cross-linked base polymer 100 having reactive pendant moieties. The base polymer 100 is modified in accordance with a preferred embodiment of the present invention by forming a cross-linked skin 102 onto a surface thereof.

The base polymer 100 is preferably supported onto a substrate or support 104, typically a non-woven or woven textile substrate. Base polymer 100 is preferably covalently bound to substrate 104. Such covalent binding between all structural components imparts extremely high chemical stability to the novel membrane in aggressive operating conditions such as extreme pH levels, high concentrations of acids or caustics, presence of organic solvents, pressure, temperature and oxidation stability. Alternatively, the membrane may also be free-standing.

Cross-linked skin 102 is formed on a surface of base polymer 100. The surface preferably includes a top surface of base polymer 100, and may also include other exposed surfaces of base polymer 100, such as exposed surfaces of pores in the base polymer as seen in FIG. 1.

The membranes of one embodiment of the present invention are preferably microfiltration (MF) or ultrafiltration (UF) membranes, most preferably UF membranes. In general, the term "microfiltration membranes" refers to membranes with pores having an average diameter of greater than about 0.1 microns. They are commonly used to filter out small particles from a liquid while allowing the passage of smaller components such as dissolved salts and organic species having a molecular weight of less than about 100,000.

Ultrafiltration membranes typically have pore sizes of from about 0.1 micron to about 5 nanometers. UF membranes are commonly classified by their ability to retain specific-sized components dissolved in a solution. This is referred to as the molecular weight cut-off (MWCO). UF membranes are commonly used to retain proteins, starches, and other high to medium molecular weight dissolved species, while allowing the permeation of simple salts and smaller dissolved organic compounds.

Usually MF and UF membranes are cast from solutions of polymers in selected organic solvents and have an asymmetric structure, as seen in FIG. 1. This means that the porosity of the base polymer varies from a top layer 106, having relatively small pores, to the bottom of the base polymer having relatively large pores. This structure offers an optimal combination of mechanical stability and resistance to compaction under hydrostatic pressure and minimal resistance to flow passage, where the relatively thin top layer 106 having the smallest pores imparts selectivity to the membrane. The operating pressure used in MF or UF applications is usually 0.1-5 atmospheres.

Base polymer 100 is preferably chosen from acrylonitrile homo-, co- and tri-polymers, polyamides (aliphatic and aromatic), polyvinyl chloride and its copolymers, chlorinated polyvinyl chloride, cellulosics, epoxy resins (e.g. polyphenoxy), polyarylene oxides, polycarbonates, homo- and co-polymers on the basis of heterocyclic compounds, (e.g. polybenzimidazoles), polyvinylidene fluoride, polytetrafluoroethylene, polyesters (saturated and non saturated which may be cross-linked through the double bonds after membrane formation), polyimides, fluoropolymers, polysulfones, polyether sulfones, polyaryl sulfones, polyetherketones, polyether etherketones, polyelectrolyte complexes, polyolefins, polyphenylene sulfide, and polyphenoxy polymers, and derivatives of the above listed polymers which can be made into asymmetric membranes. Such derivatives are generally but not exclusively based on sulfonation, nitration and amination, carboxylation, hydroxylation, nitrilation, halogenation (e.g. bromination), hydroxy methylated, ethers and esters of hydroxylated derivatives, and partial hydrolysis to increase the number of end groups. Asymmetric membranes may also be made from a mixture of more than one polymer, e.g., polyvinylidene fluoride and polyvinyl acetate.

Derivatives of engineering plastics, some of which have been mentioned above, dissolved in appropriate solvents may also be used as base polymer 100. Examples of such engineering polymers are polysulfones, polyethersulfones, polyphenysulfones, polyetherketones, polyetheretherketones, aromatic polyamideimide, polyimides, +polyphenylene oxides, polybenzimidazoles, aromatic polyamides, phenoxypolymers, fluoropolymers such as polyvinylidene fluoride and its copolymers, polyolefins such as polyethylene and polypropylene and their copolymers, polyvinyl chloride and its copolymers, polystyrene and its co and tri polymers, polyacrylonitile and co and tri polymers, etc.

In order to form cross-linked skin 102, base polymer 100 must have reactive pendant groups. While the pendant groups can comprise any reactive moiety, preferred groups are halogen and nitrile groups.

In some embodiments, the pendant groups are intrinsic to base polymer 100. Especially preferred polymers are polyacrylonitrile, polyvinylidene fluoride, and copolymers thereof. Polyacrylonitrile is most especially preferred.

In other embodiments, the reactive pendant groups are added to the outer surface of base polymer 100 by a chemical process. Polysulfone, polyether sulfone and polyphenylene sulfone are known to have very good stability in concentrated acids and bases, and are resistant to oxidizing media, and are thus preferred polymers to be used as base polymer 100. Polyether sulfone is especially preferred. However, since they do not have reactive functional groups, it is necessary to carry out a pretreatment step in which reactive functional groups are attached to or grafted onto the porous surface of the membranes.

Some non-limiting examples of chemical reactions that can introduce such functional groups are:

(1) Oxidation of the surface with oxidants such as ozone or ammonium persulfate, followed by a reaction with multifunctional reagents such as a derivative of cyanuric chloride, for example, whereby the membrane becomes amenable to a subsequent step of cross-linking with high MW PEI (mentioned above).

(2) Plasma oxidation of the top layer, whereby —OH and —OOH groups, which can be subsequently reacted with a variety of amine and hydroxyl reactants, are introduced into the surface.

(3) Formation of diazonium groups onto aryl polymers according to a method described in U.S. Pat. No. 5,024,765, incorporated herein by reference.

(4) Radical grafting of vinyl moieties which can be subsequently bound to a cross-linking polymer such PEI or PVA.

(5) Other methods of introducing a variety of functional groups onto polysulfones mentioned in the literature, such as carboxylation, sulfonation or electrophilic aromatic substitution sulfonation, such as mentioned in A. Noshay and L. M. Robertson, J. Appl. Polym, Sci., 20, p. 1885 (1976); halomethylation as mentioned in A. Warshaysky et al, J. Polym. Sci. Part A: Polym. Chem., 28, p. 2885 (1990); nitration, amination and bromination as mentioned in M. D. Guiver, O. Kutowy and J. W. A. Simon, Polymer, 30, p. 1137 (1989); chlorosulfonation as mentioned in Quing Shi et al. J. of Membrane Sci. 319 p. 271 (2008). All these are incorporated herein by reference.

Pendant groups in such functionalize polymers may be, for example, sulfonic, chlorosulfonic groups, carboxylic, nitro, hydroxyl, hydroxymethyl, esters and ethers of the hydroxymethyl and hydroxyalkyl and hydroxyaromatic groups and their ester and ether derivatives, halomethyl groups, sulfide, and thioalkyl and thioaromatic, vinyl, allylic, acetylenic, phosphine, phosphonicand phosphinic, amino methylated etc. The substituted polysulfone membranes described in U.S. Pat. No. 4,894,159, U.S. Pat. No. 4,517,353, and A. Warshawsky et al., J. of Polymer Sci., Part A: Polymer Chemistry, Vol. 28, 3303-3315 (1990) all incorporated by reference herein. An attractive way of deriving aromatic polymers, especially polysulfone polymers is by the halomethylation and subsequent derivatization as described in the Warshawsky reference.

Cross-linked skin 102 is formed by reacting an oligomer or polymer, preferably a polymer, with the reactive pendant groups on the surface of base polymer 100. The oligomer or polymer can be any compound that can react with the reactive pendant moieties on the base polymer. Advantageously, the oligomer or polymer has groups selected from primary amino, secondary amino and hydroxyl groups. Polyethylenimine and polyvinylalcohol are preferred polymers, and polyethylenimine is especially preferred.

Due to the convenience of working with aqueous solutions, the polymer used to form cross-linked skin 102 is preferably a hydrophilic polymer. However, it will be appreciated that cross-linked skin 102 can also be formed using a hydrophobic polymer, so long as the hydrophobic polymer can react with the reactive pendant groups of base polymer 100.

Reference is now made to FIG. 2A, which is a computer-enhanced photomicrograph of one example of the ultrafiltration membrane of FIG. 1. The membrane shown in FIG. 2A comprises polyacrylonitrile as the base polymer supported on a non-woven textile substrate (not shown). The cross-linked skin is formed by reaction of polyethylenimine with the polyacrylonitrile base polymer.

Reference is now made to FIG. 2B, which is a computer-enhanced photomicrograph of another example of the ultrafiltration membrane of FIG. 1. This membrane comprises polyether sulfone as the base polymer supported on a non-woven textile substrate. It is seen in FIG. 2B that the membrane is asymmetric, with pore size increasing from the top of the membrane to the bottom.

Examples of commercially available membrane products include Abcor HFK-131 MWCO 10K, Osmonics Sepa HZ-03 (MWCO 40 to 50K) and Sepa HZ-05 (MWCO 2K), Desal E-100 (MWCO 35K) and E-500 (MWCO 500,00), Filtron Omega 300K, 30K and 10K, and UF and MF membranes from Sepro, Nadir, GE, PCI, and X-Flow and Koch.

The membranes are commercially available in various configurations for various applications. Such membrane configurations include, inter alia, flat sheets, tubular, tubelets and hollow fibers. The tubes and flat sheets are preferably supported on woven and more preferably non-woven material but the tubelets and hollow fibers are generally not supported. The non-woven or woven materials may be made of polyolefins (e.g. polypropylene or polypropylene/polyethylene, polyesters, polyimides, polyamides, polyether ketones, polysulfides and inorganics or glass or metal materials.

Prior art membranes are configured in a modular form of spirals or plates and frames or hollow fibers, or tubular systems. A list of manufacturers of asymmetric porous membranes and modules, for all the different configurations, made of organic polymers, ceramics and inorganic may be found in e.g. "Handbook of Industrial Membranes", K. Scott, Elsevier Publishers, section 2.1, p. 187-269; "Basic principles of membrane technology", M. Mulder, p. 465-473 (1996); "Membranes for industrial wastewater recovery and reuse", Simon Judd & Bruce Jefferson (eds), Elsevier, Chapter 2 (2003).

Figure 3B:
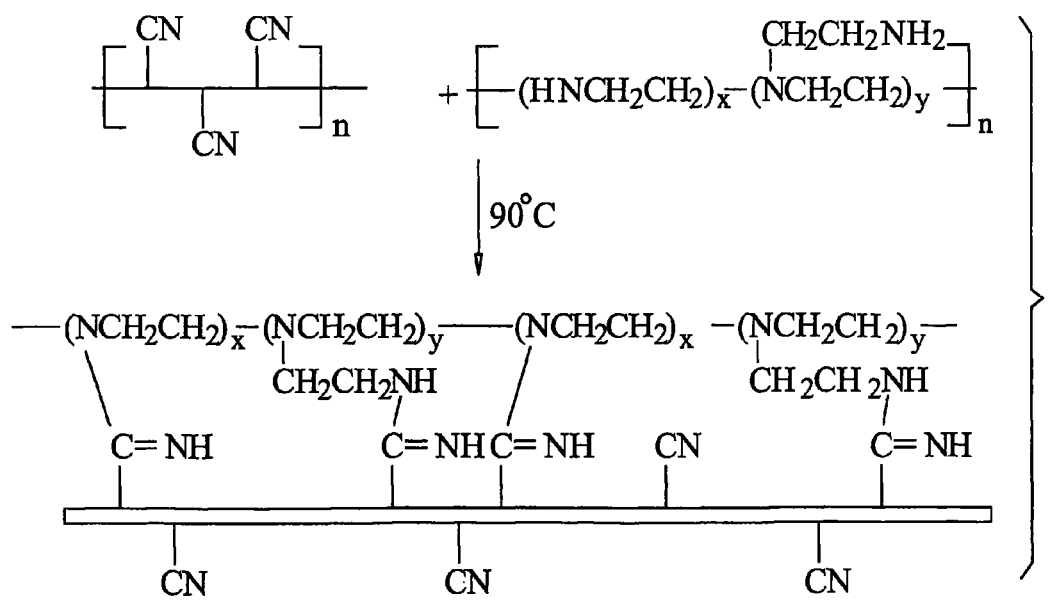

Reference is now made to FIGS. 3A and 3B, which are simplified illustrations of chemical reactions which take place in the manufacture of the ultrafiltration membrane of FIG. 1 in accordance with embodiments of the present invention and which produce covalent bonding between base polymer 100 and cross-linked skin 102.

The reaction is preferably initiated by immersing the membrane (made of polyacrylonitrile) into a solution of a polymer with which it can react (polyethylenimine). The reaction is preferably carried out at elevated temperature, usually in the range 50-100° C., preferably in the range 70-90° C. Reaction time is 1 to 72 hours, preferably 5 to 32 hours, more preferably 10 to 20 hours.

The polyethylenimine (PEI) solution has a concentration between 2%-10% (preferably 4%) in water. Molecular weight of PEI is high (between 20,000 to 750,000), however polymers, oligomers and even small organic amines can be also used according to a method of the invention; in effect the molecular weight range can cover the whole range from 400-1 million, but preferably the molecular weight is between 800-20,000.

Optionally, the reaction may be followed by a step of drying at elevated temperature, usually in the range 70-120° C., preferably in the range 80-100° C., most preferably in the range 90-95° C., and desirably using preheated air or other gas at such temperatures. A preferred time for the drying step is 1-3 hours.

The drying step is important since according to the invention the surface concentration of the amine containing surface increases, chemically modifying the surface and achieving a high surface density of cross-links. After this step the membrane is solvent stable and can be immersed in almost any solvent without being destroyed. Optionally, the bulk of the PEI layer that has been chemically attached to the PAN surface is subsequently reacted with a cross-linking species dissolved in aqueous solution. Then the membrane is dried for 1-3 hours at 40-60° C. It is then washed with distilled water and thereafter it is ready to serve as a UF support membrane for various types of membranes, such as, inter alia, NF, RO and PV.

In a different embodiment, the reaction takes place at room temperature. However, the result is a skin with a low degree of cross-linking (FIG. 3A) as opposed to the high degree of cross-linking achieved by the reaction at 90° C. (FIG. 3B). The degree of cross-linking is also affected by reaction time, drying conditions, and the molecular weight and concentration of the skin polymer, etc.

In addition to surface modification methods employing the mentioned polyamines, the surface modification method can be carried out using other types of polymers and oligomers, such as polyvinyl amines, amino derivatives of styrene and its copolymers, and polyvinyl alcohol and its derivatives. Derivatives of these polyamines can contain sulfonic, carboxylic and phosphonium groups to make charged and amphoteric monomeric, oligomeric and polymeric molecules, as described in the above patents, including U.S. Pat. No. 4,659,474, and copolymers which contain different groups, especially polar and ionic groups. As described in the above patents, the polyamines may also be taken for example from the category of polyvinylamines and their co- and tri-polymers, polyaromatic compounds such as aminopolystyrene, amine-containing engineering plastics of aromatic polysulfones, polyethylenimines and derivatives of polyethylenimine.

In addition there are polyphenol polymers such as polyvinylphenol and its copolymers. These polymers are reactive, not only through their —OH groups but also because they have activated or electron rich aromatic structures which may readily undergo electrophilic reactions with electrophiles such as formaldehyde or other aldehydes. Besides phenolic groups on a polymer chain, there may also be aryl amines which are also reactive because of both the amino groups, and the electron rich aromatic groups. Similar systems based on thiophenols are also included.

The reaction of vinyl pyridines and a dihalo organic compound forms a cross-linked insoluble copolymer, and may undergo subsequent reaction as with amines. These reactive combinations as described in U.S. Pat. No. 4,014,798, incorporated herein by reference, can be used to modify the surface layers in embodiments of the invention. The reaction between di- or poly-halogenated (especially chloro- and bromo-) alkyl and benzyl organics with polyfunctional amines and hydroxy compounds and oligomers and low molecular weight compounds are additional preferred reactions.

Cationic and anionic polymerization and condensation polymerization systems may also be used to modify the surface layers. Appropriate polymerization chemicals and procedures are known.

As will readily be appreciated, where possible, water is the preferred medium for many important membrane formation procedures of the invention. It is inexpensive, safe to handle and has good solubility properties especially when the components are in low concentration. The use of aqueous solvents determines the type of reactants that will be used and how they are applied. If polymeric components and reactants do not have the needed degree of solubility in water, then solvents can often be added to improve the solubility in water. Appropriate water miscible solvents include acetone, methanol, ethanol isopropanol, DMF, NMP, DMSO, THF, sulfoxane, etc., provided that their addition is at sufficiently low concentrations and will not damage the porous membrane structure or its properties. In addition the surface cross-linking method can be performed by means of hydrophobic reactive polymers that can be dissolved in organic solvents which do not damage the UF/MF membranes.

It is appreciated that polymers other than water soluble polymers may be employed. For example, polymers which are present in aqueous solution as aqueous dispersions, such as emulsions or suspensions, may also be used.

Figure 4A:
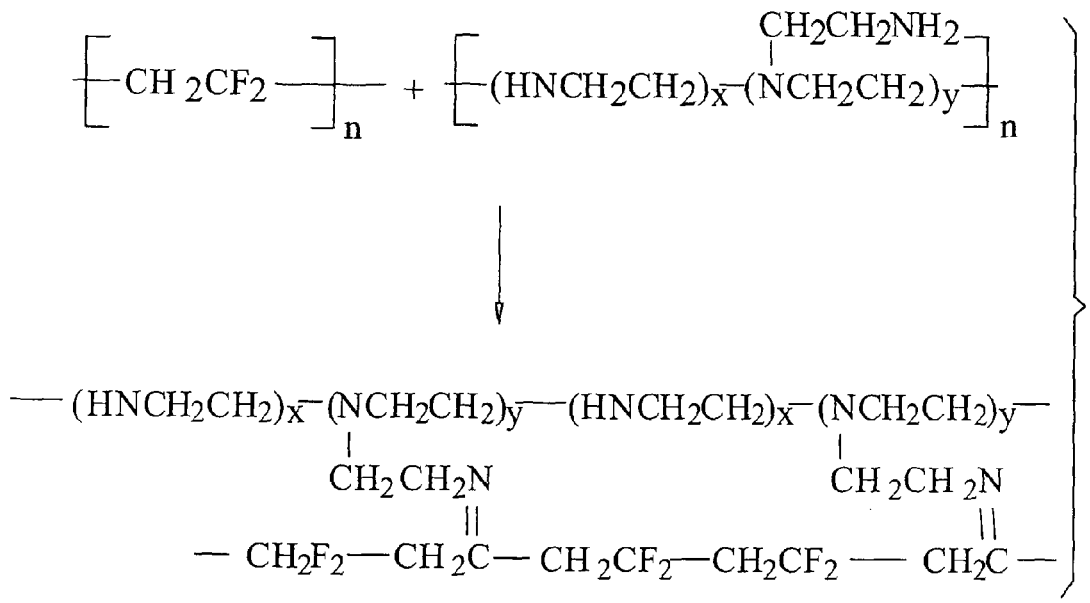
FIGS. 4A and 4B are simplified illustrations of chemical reactions which take place in the manufacture of the ultrafiltration membrane of FIG. 1 in accordance with another embodiment of the present invention and which produce covalent bonding.
Figure 4B:
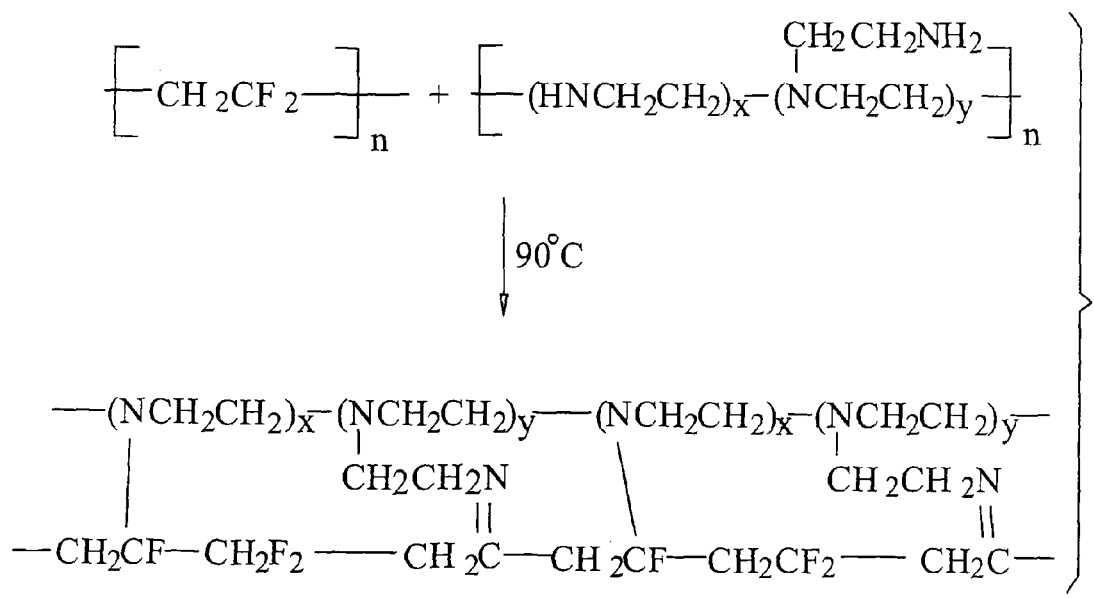

Reference is now made to FIGS. 4A and 4B, which are simplified illustrations of chemical reactions which take place in the manufacture of the ultrafiltration membrane of FIG. 1 in accordance with another embodiment of the present invention. In this embodiment, base polymer 100 comprises polyvinylidene fluoride (PVDF) instead of PAN.

In the case of PAN and PVDF membranes, a direct reaction with PEI, for example, occurs on the surface forming a chemically bound and stabilized, surface cross-linked membrane with unique stability in organic solvents. This is a surprising outcome, since, according to the prior art, in order to achieve solvent stable membranes, the cross-linking reaction must occur in the entire bulk of the polymeric membrane. The prior art suggests that only low MW reactants acting in presence of swelling agents could cross-link the entire membrane matrix. However, surprisingly, in accordance with the present invention, the use of high molecular PEI chemically reacted with the surface of a porous UF or MF membrane, is sufficient to impart to such treated membrane outstanding stability to a great many organic solvents.

It will be appreciated that the present invention provides a significant advantage promising significant savings in manufacturing chemically stable membranes by using commercially available polymers, casting formulations and membranes. For example, by using this novel fabrication methodology it is possible to take a commercially available UF or MF membrane made from PAN or PVDF and by using the existing functional groups on the membrane surface, to convert such membranes to highly solvent resistant UF/MF membranes by reacting them on a surface with a polymeric reactant.

After achieving solvent stability in this manner, the modified membrane can be exposed to many additional reactions if required. Such addition of functionality sometimes requires rigorous reaction conditions in organic solvents and could not have been performed effectively without causing structural and functional damage to the porous membrane, prior to obtaining the modified membrane in accordance with embodiments of the present invention. A more detailed description is given below.

The membrane may be treated, prior to operating in accordance with the method of the invention, by well known, state-of-the-art methods, such as cleaning with surfactants, use of surfactants to modify wetting properties, annealing by heat treatment to change pore size, and/or pre-wetting with solvents to which such membranes are stable.

According to the approach disclosed herein, a polymeric asymmetric or porous UF/MF membrane that already has good chemical stability in some environments may be selected, and by modification, good stability in organic solvents may be imparted thereto. As a result of this approach, the general stability of such surface cross-linked membranes is significantly improved. For example, not only the solvent stability of PAN is improved but also its stability with respect to concentrated acids. Whereas unmodified PAN membranes disintegrate after a short period of time in 20% sulfuric acid at 90° C., and would be dissolved by many organic solvents, after processing such membranes in accordance with the methodology of an embodiment of the invention, modified PAN membranes that have a combination of good solvent stability, compaction stability and stability in hot sulfuric acid are obtained.

The methodology may be adopted for achieving polymeric membranes that have enhanced stability in complex environments, combining resistance to attack by organic solvents and by aggressive chemical conditions such as extreme pH, aggressive oxidizing environments and the like. A polymeric UF membrane support that is known to have stability in certain aggressive environments may be selected and modified by covalent attachment to a surface of a UF/MF support so that after the covalent attachment modification step, the membrane possesses additional stability against attack by organic solvents. For example PVDF is known to possess good stability in an acidic environment, and, by modifying by covalent attachment such PVDF membranes, a combination of acid and solvent stability is obtained.

The preferred use of PEI in the present invention is based on its bi-or-multi-functional character, whereby it may perform multifunctional attachment to, e.g. PAN, PVDF and other derivatized membranes, by cross-linking to the surface, thereby modifying the surface and creating a reactive layer at the surface of UF/MF membranes, rendering them reactive with subsequent layers.

When the membrane material does not have reactive groups, it is possible to graft chemical functional groups onto the surface of the UF/MF membrane under mild reaction conditions and then subsequently to react a polymeric reactant with this modified membrane also under mild reaction conditions without causing any damage to the membrane. In this manner, such modified membranes are imparted with excellent solvent stability. For example PES (polyether sulfone) membranes that are known to have good acid, base and oxidizing stability can be reacted on their surfaces with a polymeric reactant to generate unique chemically stable membranes with unusual +combinations of properties such as solvent, acid base and oxidation resistances, for example.

Often UF membranes serve as substrates for producing a tighter class of membranes such as pervaporation (PV), nanofiltration (NF) and reverse osmosis (RO) membranes, where a top PV or NF or RO layer that is facing a liquid being treated is located on the UF support. The NF & RO applications are used at much higher pressures than those used in the MF or UF applications. Typical operating pressures are in the range of 10-40 bars in the NF applications and 20-100 bars in the RO applications. As a result, compaction of UF supports and mechanical deformations may occur and cause damage to the connection between the different parts of the membrane (non-woven support, UF membranes and the top NF or RO layers).

Figure 5:
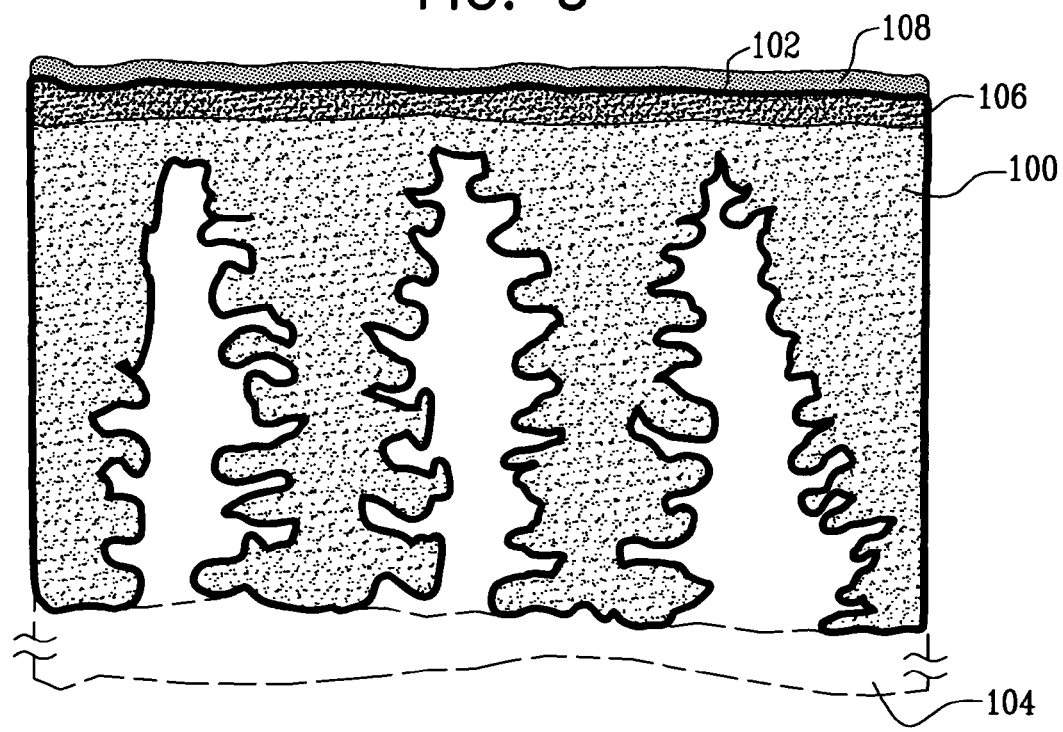
FIG. 5 is a simplified illustration of a nanofiltration membrane constructed and operative in accordance with an embodiment of the present invention.

Reference is now made to FIG. 5, which is a simplified illustration of a nanofiltration membrane constructed and operative in accordance with an embodiment of the present invention. As illustrated in FIG. 5, there is provided a polymeric nanofiltration membrane including a non-cross-linked base polymer 100 having reactive pendant moieties. The base polymer 100 is modified by forming a cross-linked skin 102 onto a surface thereof. A nanofiltration layer 108 is formed on the top surface of cross-linked skin 102. Base polymer 100 and cross-linked skin 102 are preferably as described hereinabove with reference to FIGS. 1-4B.

Nanofiltration layer 108 comprises at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl. Nanofiltration layer 108 optionally comprises at least one supplemental cross-linker.

In some embodiments, the di-, tri- or tetra-halo substituted diazine or triazine-containing monomer or oligomer is selected from the group consisting of:

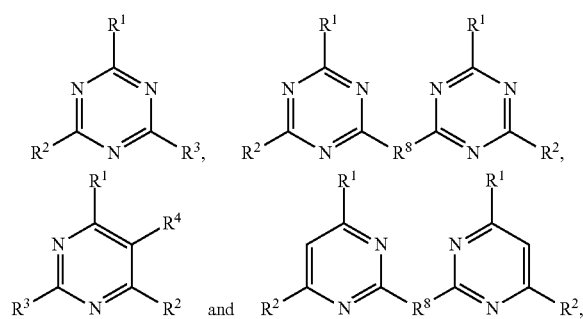

wherein:
$R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;
$R^2$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;
$R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;
$R^4$ is selected from H, bromo, chloro, fluoro, —$NHR^5$, —$OR^5$ and $SR^5$, wherein
$R^5$ is independently selected at each occurrence from H, optionally substituted alkyl and optionally substituted aryl; and
$R^8$ is independently selected at each occurrence from —$NH_2$— and —NH-A-NH—, wherein A is selected from $C_{1-20}$ aliphatic moieties, $C_{6-10}$ aromatic moieties, and combinations thereof;
provided that at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

In some embodiments, the multifunctional amine is selected from the group consisting of polyethylenemine, polyvinylamine, polyvinylanilines, polybenzylamines, polyvinylimidazolines, and amine-modified polyepihalohydrins. Polyethylenimine is especially preferred.

In some embodiments, the supplemental cross-linker is selected from the group consisting of 2,4,6-trichloro-s-triazine, 4,6-dichloro-2-sodium p-sulfoanile-s-triazine (4,6-dichloro-2-p-anilinesulfonic acid sodium salt-s-triazine), 4,6-dichloro-2-diethanolamine-s-triazine and 4,6-dichloro-2-amino-s-triazine. In some embodiments, the matrix comprises cationic functional groups.

When the di-, tri- or tetra-halo substituted diazine- or triazine-containing compounds that are utilized to make the nanofiltration layers that are used in accordance with embodiments of the present invention are in the form of oligomers or polymers, the individual diazine or triazine units may be bonded by linkages which consist primarily of aliphatic, aromatic or mixed aliphatic/aromatic hydrocarbon fragments, e.g. one or more straight or branched $C_{1-20}$ aliphatic units which may also bonded to one or more $C_{6-10}$ aromatic units. These linkages may further contain, and be bonded directly to, the diazine or triazine portions, by amine linkages, i.e. via C—N bonds. Such linkages may also be —NH— linkages. It will be appreciated that not all the linkages in the polymers used in embodiments of the invention need be acid stable, provided that the percent of such non-acid stable linkages is sufficiently small that membrane performance will still be acceptable.

In the context of this application, the term "multifunctional amine" refers to a compound having at least one primary or secondary amine moiety and at least one other functional group, such as —COOH, ester, amide, ketone, aldehyde, tertiary or quaternary amine and the like. In some embodiments, the multifunctional amine contains a first primary or secondary amine near one terminus of the molecule and a second primary or secondary amine near another terminus of the molecule. In some embodiments the multifunctional amine contains multiple primary or secondary amine moieties spaced intermittently through the molecule.

It will be appreciated that the multifunctional amines used in producing the NF membranes used in accordance with embodiments of the invention generally have one or more carbon chains (in which some carbon atoms may optionally be replaced with O or N) and/or carbon rings, such as phenyl rings, so that the multifunctional amines will have molecular weights ranging from 400 to 750,000. The multifunctional amines may thus be oligomeric or polymeric compounds having both amine functionality as well other functionality, which may appear at regular or semi-regular intervals, although they may also be monomeric (preferably having at least two separate amine moieties on the monomeric molecule), provided that they may cross-link with at least two of the halo-substituted diazine or triazine moieties.

The multifunctional amines used to make polymer nanofiltration layers for use in embodiments of the invention may be amine compound residues derived from an amine compound having any organic nucleus and at least two primary and/or secondary amine groups. In some embodiments, the amine compound has the formula $R^{11}$—NH—Y—$[(CH_2)_j(NHR^{12})]_m$ wherein $R^{11}$ and $R^{12}$ are independently hydrogen or aliphatic groups of 1 to 30 carbons; Y is any appropriate organic moiety, e.g. of 1 to 30 carbons, and optionally containing one or more oxygen, sulfur or nitrogen atoms, such as an aliphatic, aryl or arylalkyl group of 1 to 30 carbons or a corresponding heteroaliphatic, heteroaryl or heteroarylalkyl group containing one or more oxygen, sulfur or nitrogen atoms; m is an integer from 1 to 3; and j is an integer of from 0 to about 10.

The functional groups present in the multifunctional amine may be chosen to help impart desired properties to the resulting NF membrane. Thus, in principle, functional groups may, for example, be ionizable groups, non-ionizable hydrophobic groups, or non-ionic hydrophilic groups. In some embodiments, the resulting NF membranes will contain cationic functional groups, as it is believed that the presence of such groups will increase the retention of copper ions. In the context of the present application, the term "cationic functional group" refers to both functional groups which are cationic at virtually all pH values (e.g. quaternary amines) as well as functional groups that can become cationic under acidic conditions and/or can become cationic through chemical conversion (e.g. primary and secondary amines or amides).

Similarly, the degree of cross-linking within the matrix will influence the properties of the NF membrane. The degree of cross-linking, which is expressed as a percentage, is defined as the number of moles of moieties which actually cross-link out of the total number of moieties available to cross-link. In some embodiments, the degree of cross-linking is from 2% to 45% mol/mol. In some embodiments, the degree of cross-linking is from 8 to 25% mol/mol. In some embodiments, the degree of cross-linking is from 9 to 15% mol/mol.

It will also be appreciated that in some embodiments, the multifunctional amines may themselves contain the halo-substituted di- and/or triazine moieties, in which case the multifunctional amines may made to self-react to form the matrix.

Figure 6:
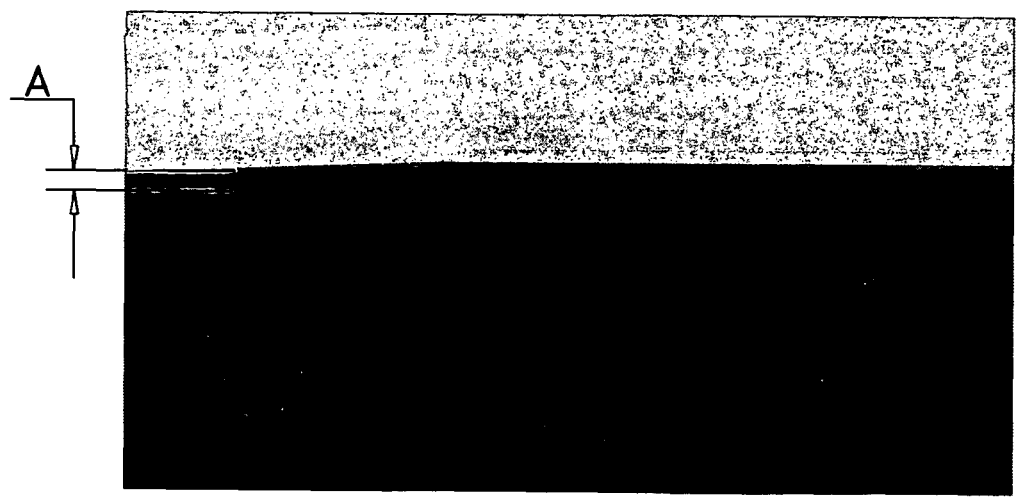
FIG. 6 is a computer-enhanced photomicrograph of one example of the nanofiltration membrane of FIG. 5.

FIG. 6 is a computer-enhanced photomicrograph of one example of the nanofiltration membrane of FIG. 5. The membrane shown in FIG. 6 comprises polyacrylonitrile as the base polymer, a cross-linked skin formed by reaction of polyethylenimine with the polyacrylonitrile base polymer, and a nanofiltration layer A made of polyethylenimine and triazine. It is appreciated that the nanofiltration layer A is thinner and denser than the ultrafiltration layer over which it is formed.

In order to enable permeation of a fluid through a membrane, there should exist a plurality of pores, void spaces, or free volumes within the membrane which can act as conduits through which the fluid permeates. Such conduits may exist permanently within the film, or may exist transiently as with polymer dynamic fluctuations. They may be continuously connected, or they may be temporarily connected as a consequence of the random movements of the various polymer chains in the membrane. Both the size and number of these free volume regions govern the permeability of a membrane, with an increase in either leading to higher permeability. The size of these free volume regions is, however, limited by the need to retain solutes such as dissolved metal ions, cations, or organic compounds.

Typically, to prevent the membrane from transmitting solutes, the membrane should not contain a high proportion of continuous spaces, i.e., pores, void spaces, or free volume areas through which the solutes can pass without significant restriction. Large void spaces can allow feed solution to pass the membrane without significant retention of the desired solutes. In practice, such voids present in RO and NF membranes are often referred to as defects. The presence of defects does not necessarily render a membrane unusable in accordance with embodiments of the present invention, as long as there are sufficiently few defects to allow the membrane to meet its specified performance criteria.

The thickness of the nanofiltration layer also affects performance. Generally, a thicker separating layer offers greater resistance to flow and, thus, will require a higher driving force to produce a flow similar to that of a thinner membrane. For this reason, it is preferred that the thickness of the nanofiltration layer of these membranes be less than about 1 micron, more preferably less than about 0.5 microns and most preferably less than about 0.1 micron. However, a common feature of thin films is an increased tendency to exhibit defects as thickness decreases. These defects can arise from one or more of a variety of factors. In general, they are associated with a loss in mechanical integrity as the film becomes progressively thinner. For example, when the mechanical integrity of such a film is compromised, the chance that applied pressures may violate the integrity of the film increases. For these reasons it has been found that it is often useful for the nanofiltration layers to be thicker than at least about 0.005 microns, and more preferably thicker than about 0.02 microns.

It will be appreciated that when monolithic membrane structures, i.e. those in which the NF layer is covalently bound to the underlying support membrane, are utilized as in accordance with embodiments of the present invention, layers that are thinner than those used when the NF layer is not covalently bound to the underlying support membrane can be employed.

Figure 7A:
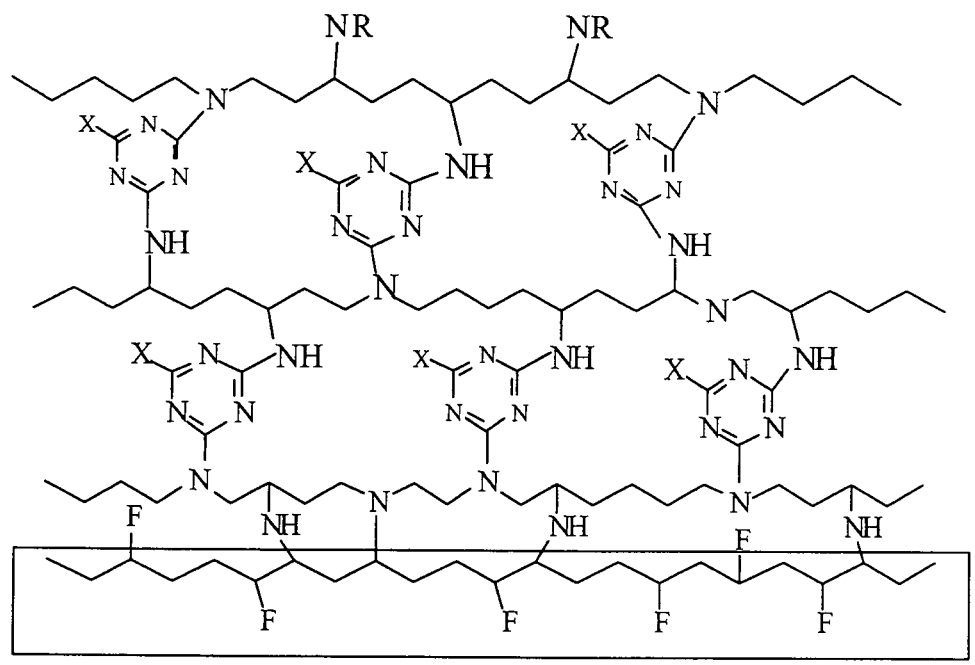
FIGS. 7A and 7B are simplified illustrations of chemical reactions which take place in the manufacture of the nanofiltration membrane of FIG. 5 in accordance with one embodiment of the present invention and which produce covalent bonding.
Figure 7B:
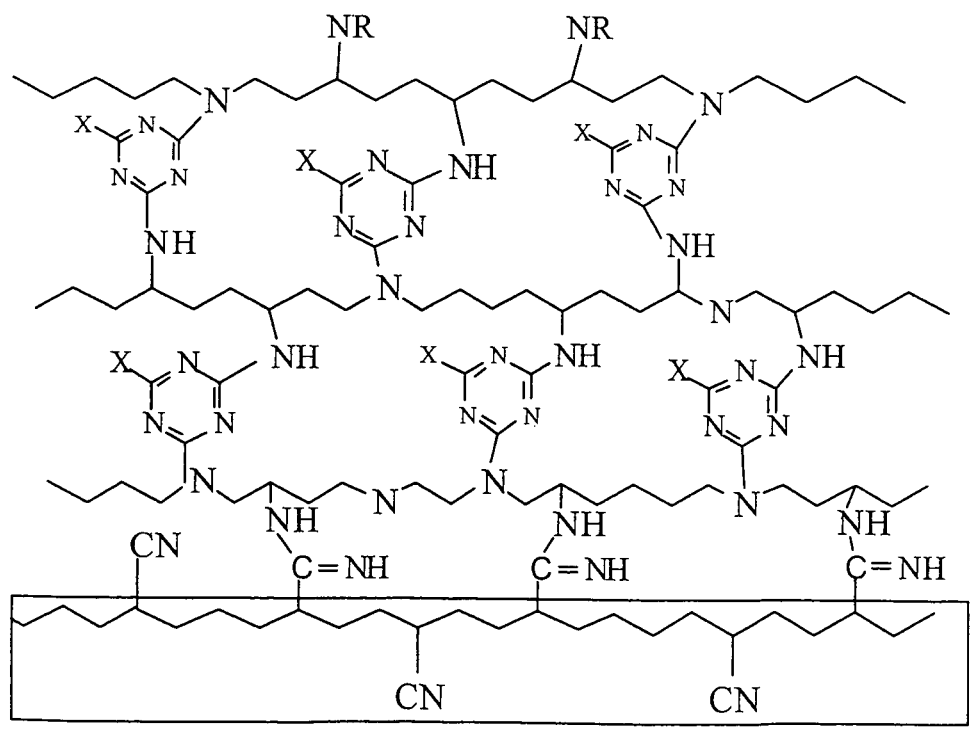

FIGS. 7A and 7B are simplified illustrations of chemical reactions which take place in the manufacture of the nanofiltration membrane of FIG. 5 in accordance with one embodiment of the present invention and which produce covalent bonding between cross-linked skin 102 and nanofiltration layer 108.

In some embodiments, the matrix is formed by a process which comprises providing an asymmetric base ultrafiltration membrane which at one face thereof has pores of smaller diameter than at the opposite face; providing a solution containing at least one di- or tri-halo substituted diazine or triazine-containing monomer or oligomer, at least one multifunctional amine having a molecular weight in the range of 400 to 750,000, and optionally, at least one supplemental cross-linker; and bringing the solution into contact with the face of the ultrafiltration membrane having smaller pores under superatmospheric pressure for a time sufficient to effect covalent bonding of the at least one di- or tri-halo substituted diazine or triazine-containing monomer or oligomer and the at least one multi-functional amine.

In some embodiments, the time and pressure are sufficient to effect covalent bonding at of the least one di- or tri-halo substituted diazine or triazine-containing monomer or oligomer, the at least one multi-functional amine, and the surface of the pores of the ultrafiltration membrane. In some embodiments, prior to the contacting, the ultrafiltration membrane has been modified to facilitate covalent bonding to the surface thereof. In some embodiments, the formation of the nanofiltration membrane further comprises, after the contacting, heating the ultrafiltration membrane.

The matrix layer may also be covalently bound to the underlying UF or MF support by other attachment methods, such as by a direct chemical reaction not involving an application of hydrostatic pressure or vacuum, dip coating methods and coating of the UF support (e.g. by gravure coating, knife coating or air knife coating) following by formation of a matrix layer in a manner that results in covalent binding to a UF or MF support membrane.

When the multifunctional amine is a polymer or oligomer, and/or the halogenated di- and/or triazines are present as part of a polymer or oligomer, the polymers or oligomers may include functional groups as part of the polymer/oligomer chain, e.g., a polyamine oligomer, or these groups can be attached as pendant groups. These groups can be incorporated into the polymer by any suitable route. A particularly efficient method is to use a multifunctional monomer with the desired functionality, or a derivative of the functionality, incorporated within the structure. Appropriately prepared polymers incorporating such monomers would have the desired functionality throughout the membrane matrix.

It has been found that a condensate formed from cyanuric chloride and sulfanilic acid, a synthesis of which is described below, is a suitable halogenated triazine for use in preparing membranes for use in accordance with embodiments of the present invention.

Non-limiting examples of a functional group that are cationic at all pH ranges are quarternary ammonium groups. Primary, secondary and tertiary ammonium groups are examples of groups that become cationic at certain pH levels. Another type of a "cationic functional group" is one which is generated by a chemical reaction. It will be clear to those skilled in the art that the phrase "potentially cationic" refers simply to chemical functional groups which are cationic or could become cationic based on pH and/or chemical conversion.

It will be appreciated that the nanofiltration layer need not necessarily contain an excess of cationic functionality. If the nanofiltration layer can be prepared with sufficiently designed separation channels, a separation can be attained mainly through size exclusion. However, it is believed that in most instances, suitable membranes will possess cationic or potentially cationic groups which assist the separation through charge-charge interactions.

In some embodiments the polymer, such as an amine-containing polymer or trazinic polymer, contains mixed charged groups, such as a mixture of cation exchange groups (e.g. sulfonic or carboxylic) and anion exchange groups (e.g. quaternary ammonium groups). Such mixed charges can be distributed homogenously through the matrix or separated into domains, for example by using block copolymers to prepare the matrix, wherein separate blocks of the block copolymer have a cationic or anionic character.

In an example shown in FIG. 7A, base polymer 100 is polyvinylidene fluoride. Cross-linked skin 102 is formed by reacting polyethylenimine with the polyvinylide fluoride. Nanofiltration layer 108 is formed by reacting polyethylenimine and a halo-substituted triazine compound with the cross-linked skin. FIG. 7B is similar to FIG. 7A except that in FIG. 7B, base polymer 100 is polyacrylonitrile.

In order to evaluate the long-term stability of the membrane in acids, a suitable method is to use temperature to accelerate degradation. As a reasonable approximation, the rate of many such degradation reactions is doubled with every 10° C. increase in temperature. Thus a thirty-day exposure to an acid at 40° C. can be approximated with a 24 hour exposure at 90° C. Of course the high temperature method is not possible for membranes including heat sensitive polymers or other membranes where whose membrane degradation is not temperature dependent in the manner described above. In such cases, a lower temperature, longer exposure test is required to gauge acid stability.

It is not the intent of this disclosure to exclude such heat sensitive polymers, rather, to provide an acid stable membrane and a test for gauging acid stability. For purposes of the present patent application, it will be appreciated that membranes assessed on the basis of performance need only meet one of the three recited performance criteria, namely, for example, exposure of the nanofiltration membrane to either (i) 75% sulfuric acid at 60° C. for 300 hours, (ii) 20% sulfuric acid at 90° C. for 180 hours, or (iii) 20% sulfuric acid at 45° C. for 60 days, the nanofiltration membrane removes at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.

The present invention provides improved membranes that show desirable stability and performance under a variety of conditions, including presence of organic solvents and strong acids. The improved membranes are formed by the reaction of reactive groups on the surface of a commercial membrane with a polymeric reactant.

Improvements in the water, chemical, food, energy and pharmaceutical industries often require developing and improving production processes to lower raw material and energy consumption, to minimize wastage and the resultant environmental damage, and to recover waste materials, water and solvents. Membrane separations are becoming increasingly important in this worldwide effort. For many applications, however, the existing membranes are still not sufficiently selective and/or stable. There are many examples of industrial applications that could benefit from the advantages of membrane technology, provided that membranes possessing the proper and diverse combination of stability and selectivity are available. However the required combination of such separation and stability characteristics is often lacking.

The following are examples of some of the required properties for membranes required by industry but not available:

(i) the combination of acid stability (20-90% acid concentrations) and solvent stability is required for removing organic solvents from concentrated mineral acids;

(ii) the combination of stability in organic solvents with stability in high alkaline conditions is required for separations in pharmaceutical, chemical and metal industries;

(iii) compaction stability under high applied hydrostatic pressures at elevated temperatures, and sometimes in the presence of organic solvents is required for performing separations in many types of industrial wastewater streams;

(iv) separating soluble catalysts from organic solvent streams in extreme pH conditions and in oxidizing or highly reactive environments require appropriately stable membranes.

One objective of the present invention is to provide a method for converting almost any polymeric asymmetric MF and/or UF support membrane into a surface cross-linked, chemically and solvent stable membrane that is fully integral, mechanically stable and having on the surfaces of each layer of the membrane, functional groups that are capable of being chemically bound to any of the adjacent layers, thereby forming a monolithic robust structure.

It will be appreciated that many separation processes may benefit from improvements to membrane technology in accordance with the present invention. Process simplicity, energy saving, economic advantage, the possibility to recover and recycle raw materials, such as water, acids, bases and solvents are enhanced as a result of the provision of chemically stable support membranes in accordance with embodiments of the present invention.

In general, a modified non cross-linked polymeric semipermeable membrane is characterized by having improved stability compared to the non modified membrane in an aggressive environment characterized by at least one of the following: acid media, basic media, oxidizing species, elevated temperatures and elevated pressure.

Embodiments of the present invention relate to a method for surface cross-linking micro-porous UF or MF membranes or membrane supports, containing on the surfaces of the porous membrane structure, functional groups that can chemically attach to a polymer being reacted with such surfaces from a solution contacting the membrane surfaces, thereby converting such treated porous membrane/membrane supports to surface cross-linked, chemically stable and solvent stable membranes.

In another aspect, embodiments of the present invention provide a method for introducing chemically reactive groups, capable of subsequent chemical binding to polymers dissolved in a solution in contact with the membrane surfaces, to the surfaces of porous membranes not containing such reactive groups initially.

In yet another aspect, embodiments of the present invention provide methods for binding porous membranes/membrane supports to an underlying substrate such as non-woven or woven material, thereby forming a monolithic stable membrane UF/MF structure.

In still another aspect, embodiments of the present invention provide bound polymers on the surfaces of the UF/MF micro-porous membranes that are capable of reacting and forming chemical bonds with a subsequently overlaying top layer of NF, RO, PV thin film membrane, thus forming a monolithic membrane structure in which the top layer is chemically bound to the underlying support structure. The cases where functional groups, capable of chemically binding with a top layer, already exist on the MF/UF membrane originally, are also included within the scope of the invention.

In general terms, the present invention relates to ultrafiltration (UF) and microfiltration (MF) membranes with improved solvent and chemical resistance, where the term 'chemical resistance' may imply any or all of acid, base, oxidant, thermal and compaction resistance. Such membranes can be manufactured from practically any existing membrane using virtually any type of polymer described above, including, inter alia, homo- or copolymers such as acrylonitrile, vinylidene aromatic polymers (PS, PES, PPSu), aliphatic polymers.

Moreover, embodiments of the present invention are directed to processes and to membranes made by such processes, for surface cross-linking asymmetric porous supports in MF or UF molecular weight cutoffs, that can also serve as membrane supports for the top layer comprising NF, RO, PV, MD and other types of selective barriers used in separation or conversion processes. The surface cross-linking property is achieved rapidly and efficiently, usually using aqueous treatment solutions and using well-known and relatively inexpensive reactive polymers such as amine (e.g. PEI), alcohols and other polymers such as those mentioned above.

One additional object of the present invention is to provide a method for manufacturing solvent and chemically resistant membranes made from pre-cast UF/MF membranes or other types of microporous membranes based on e.g. polyarylsulfone polymers modified by chlorosulfonation in an organic solvent that does not cause any damage to the membrane. More specifically the membranes may be modified by a chlorosulfonation reaction in glacial acetic acid or a mixture of acetic acid with non-polar solvents such as $CCl_4$ and others.

The functional groups added to the surface of the UF/MF membrane may be capable of reacting on the surface with the reactive polymers. In cases where such direct binding reaction is not possible, for example when the grafted groups are amines, alcohol or similar compounds, an intermediate multifunctional group may be reacted with the activated surface making it amenable to a reaction with a cross-linking polymer. Non-limiting examples of multifunctional groups are: triazines, diazines, or their derivatives. Instead of triazines or diazines, conditions may be found for the use of water soluble polyepoxides or an emulsion of water insoluble liquid epoxides, dihaloquinoxalines, polyaldehydes, polyisothiocyanates, polyalkyl halogens and polybenzyl halogens and other cross-linkers referred to above for reaction with reactive amino, hydroxy and sulfide containing polymers and oligomers, as well as different types of silane derivatives.

In another preferred system polyhydroxy phenols or hydroxy benzene reagents or hydroxy or hydroxy methyl aromatic polymers such as hydroxymethyl polysulfones are reacted with the membrane using polyaldehydes or formaldehyde. In this case the reaction can proceed under acidic or basic conditions. The conditions of reaction are readily determined.

WO 99/40996, the contents of which are incorporated herein by reference, discloses a method for making nanofiltration membranes by applying superatmospheric pressure to force reactants in dilute solution into the smaller pores of asymmetric base membranes. The reactants then react in the pores to form a macromolecular structure within the pores and, if the reaction is allowed to continue for sufficient time, on the outer surface of the base membrane, thus forming a thin film on the base membrane (i.e. a matrix), yielding a composite membrane. The reactants are chosen so that the resulting film is a polymer film; if a cross-linker is included among the reactants, the polymer chains may be cross-linked. Depending on the nature of the functional groups present in the film, different properties may be imparted to the nanofiltration membrane.

WO 99/40996 does not disclose the use of di-, tri- or tetra-halo substituted diazine or triazine-containing monomers, oligomers or polymers, in which the monomer is not a di- or triazine having only chloro substituents, as reactants. It has now been found that by using such compounds, in combination with multifunctional amine compounds as reactants (which react with the diazine- and/or triazine-containing monomers, oligomers and/or polymers to form a cross-linked matrix), optionally with additional cross-linkers, it is possible to obtain composite membranes that are stable to the acids used in copper separation processes for long periods of time, retaining both their flux and separation (selectivity), even at extremely low pH's. Use of these membranes in metal separation or recovery processes can therefore improve the efficiency of the separation or recovery processes of copper and other metals.

In particular, it has been found that after even after exposure of such composite nanofiltration membranes to at least one of (i) 75% sulfuric acid at 60° C. for 300 hours, (ii) 20% sulfuric acid at 90° C. for 180 hours, or (iii) 20% sulfuric acid at 45° C. for 60 days, the nanofiltration membranes remove at least 70% of the copper ions at a flux greater than 1 gfd from a feed solution of 8.5% $CuSO_4$ in 20% sulfuric acid when the feed solution is applied to the membrane at a feed pressure of 600 psig and a temperature of 25° C.

Similarly, WO 99/40996 does not disclose the stability achieved as a result of covalently binding the NF matrix to the underlying UF support. Such membranes can be produced by using matrices and UF supports, as described in co-pending U.S. provisional patent application No. 61/193,962, and display the stability desired for use in copper separation processes.

U.S. Pat. No. 4,659,474 discloses the formation of UF membranes by coating on a porous polymeric substrate containing functional groups a chemically reactive hydrophilic polymer from a dilute aqueous solution under pressure and cross-linking the polymer present on the porous substrate as a thin layer with low molecular weight polyfunctional compounds. The membranes obtained are not suitable for use as NF membranes, as their pore sizes are too large.

In order to maintain the mechanical integrity of a thin film composite membrane while in the presence of significant pressure differentials, it is common practice to provide a thicker porous membrane to act as a support for the thin film (i.e. the matrix). Typically, these support materials are 25 to 100 microns thick, although the actual thickness is not critical, provided that it imparts the necessary mechanical support at the required operating pressures. The supporting layer should provide minimal resistance to flux relative to that of the thin film. Suitable supports are often found in ultra- or micro-filtration membranes. These membranes have both good mechanical integrity and a nominal resistance to flow relative to the thin films. Such supporting membranes are well known and can be prepared by numerous techniques such as phase inversion and track etching, among others. The material constituting the semipermeable support is relatively unimportant so long as it is stable to the feed solution, pressure, and temperature, and so long as it is compatible with the thin film. Non-limiting examples of materials which may be utilized to make the underlying supporting membrane include polysulfones, polyethersulfones, polyvinylidene fluoride, polytetrafluoroethylene, polyvinylchloride, polystyrenes, polycarbonates, polyacrylonitriles, polyaramides, nylons, melamines, thermosetting polymers, polyketones (including polyether ketones and polyetheretherketones), polyphenylenesulfide, ceramics, and porous glass. In some embodiments the supporting membranes are UF membranes which have been prepared as described in provisional U.S. Provisional Patent Application No. 61/193,962. In the case of polysulfones, polyethersulfones, polystyrenes, polyaramides, nylons, polyketones and polyphenylenesulfides, prior to forming the NF matrix thereupon, it may be desirable to modify the UF support by (a) forming a cross-linked UF layer on the underlying UF support membrane, (b) introducing functional groups which can react with the multifunctional amine and the halogenated di- or triazine compound, or both. U.S. Provisional Patent Application No. 61/193,962 describes methods by which such modifications may be effected.

In some embodiments, the support material has an A value greater than 3 $l/(m^2 \times h \times bar)$, preferably greater than 5 $l/(m^2 \times h \times bar)$ and more preferably greater than 10 $l/(m^2 \times h \times bar)$, provided that these values are obtained at an actual pressure at which the final NF membrane will operate. This is due to the fact that A values of most ultrafiltration supports declines when a hydrostatic pressure is applied to them. In some embodiments the support material has an A value greater than 40 $l/(m^2 \times h \times bar)$. In some embodiments the support material has an A value greater than 100 $l/(m^2 \times h \times bar)$. The A value of the support membrane should not decline below the A value of the matrix membrane under the applied hydrostatic pressure. In some embodiments, the A value of the support membrane is at least 50% higher than the A value of the matrix itself. In some embodiments, the support material preferably has a molecular weight cut off (measured by the ASTM method at 90% dextran rejection) of less than 500,000. In some embodiments the molecular weight cut-off is less than 100,000. In some embodiments the molecular weight cut-off is less than 30,000. In some embodiments the molecular weight cut-off of the support material is less than 20,000.

As explained in WO 99/40996, the support material should have sufficient initial permeability to the reactants to enable them to enter the pores of the support material under superatmospheric pressure. In some embodiments this initial permeability is at least 2%. In some embodiments it is at least 5%. In some embodiments it is at least 10%. In some embodiments it is at least 15%. In some embodiments it is at least 20%.

Also as explained in WO 99/40996, it will be appreciated that the reactants in the dilute solution penetrate into the pores of the underlying base membrane, where the reactants become sufficiently concentrated to react therein, whereas by contrast little or no reaction takes place initially in the solution or on the outer surface of the underlying support membrane. When reaction at the surface takes place, this will generally occur as an extension of the reaction in the pores. The base membrane will necessarily have a molecular weight cutoff which allows passage of the reactants into the pores, so that and under the applied conditions, e.g. of pressure, temperature, pH and ionic strength, the concentration of the reactants within the pores will increase, resulting in chemical reaction with covalent bond formation, which may include formation of coordinate covalent bonds and conjugated bonds. This reaction occurs primarily and selectively within the upper smallest pore volumes of the underlying membrane, and not significantly in the solution or within the larger pores of the underlying structure of the support. A barrier is thus built up from the interior of these pores and towards the upper exterior surface of the underlying membrane. The thickness and density of the materials in the pores is a function of the concentration and molecular weight of the reactants, the reaction conditions, the size of the pores in the upper layer of the asymmetric base membranes being modified, and the duration of the application of the pressure.

Additional details concerning the nature of the underlying support membrane, reaction conditions, post-reaction processing, such as heating, and the like are described in WO 99/40996.

Applicants have discovered that halo-substituted di- and triazine-based membranes as described herein are surprisingly stable to acidic conditions compared to commonly used membrane materials and provide membranes for the separation of copper and other metals from liquid streams that are more stable than those hitherto known. In some cases this stability may be observed, for example, in that after acid exposure under one of the conditions described above, the glucose rejection of such membranes will not decrease significantly (e.g. 5% or less) but the flux may increase significantly (e.g. 20% or more.). It will be appreciated that in forming the membranes used in accordance with embodiments of the invention, it may be desirable to include functional groups to improve retention of multivalent cations and/ or improve acid transport. Such functional groups include but are not limited to derivatives of ammonium, phosphonium, and sulfonium.

DEFINITIONS

Unless stated otherwise, the following definitions apply.

The term "cationic functional groups" includes functional groups which are cationic at virtually all pH values (e.g. quaternary amines) as well as those that can become cationic under acidic conditions or can become cationic through chemical conversion (i.e. potentially cationic groups, such as primary and secondary amines or amides).

The term "matrix" means a regular, irregular and/or random arrangement of polymer molecules such that on a macromolecular scale the arrangements of molecules may show repeating patterns, or may show series of patterns that sometimes repeat and sometimes display irregularities, or may show no pattern respectively. The molecules may or may not be cross-linked. On a scale such as would be obtained from scanning electron microscopy (SEM), X-Ray diffraction or Fourier Transform Nuclear Magnetic Resonance (FTNMR), the molecular arrangement may show a physical configuration in three dimensions like those of networks, meshes, arrays, frameworks, scaffoldings, three dimensional nets or three dimensional entanglements of molecules. The matrix is usually non-self supporting, and has an average thickness from about 5 nm to about 600 nm, preferably about 5 to about 400 nm. In usual practice, the matrix is grossly configured as an ultrathin film or sheet.

The term "membrane" means a semipermeable material which can be used to separate components of a feed fluid into a permeate that passes through the material and a retentate that is rejected by the material.

The term "monomer" or "monomeric" means a compound that has no branched or unbranched repeating units (e.g. ethylenediamine, 1,3-metaphenylenediamine).

The term "oligomer" or "oligomeric" means a compound that has 2 to 10 branched or unbranched repeating units (e.g. polyethyleneimine with 7 repeating units, tris(2-aminoethyl) amine).

The term "polymer" or "polymeric", when referring to a reactant, means a compound that has 11 or greater branched or unbranched repeating units (e.g. 20,000 MW polyethyleneimine).

The term "composite membrane" means a composite of a matrix layered or coated on at least one side of a porous support material.

The term "support material" means any substrate onto which the matrix can be applied. Included are semipermeable membranes especially of the micro- and ultrafiltration kind, fabric, filtration materials as well as others.

The term "20% sulfuric acid" means a solution of deionized water and 20% sulfuric acid by weight. For illustration, "a feed solution consisting of 9.5% $CuSO_4$ and 20% sulfuric acid" can be prepared by combining 20 grams of $H_2SO_4$, 9.5 grams of $CuSO_4$, and 70.5 grams of deionized water.

The term "average thickness" is the average matrix cross-sectional dimension. It means the average distance in cross section from one side of the matrix to the opposite side of the matrix. Since the matrix has surfaces that are at least to some extent uniform, the average thickness is the average distance obtained by measuring the cross-sectional distance between the matrix sides. Techniques such as ion beam analysis, X-ray photoelectron spectroscopy (XPS), and scanning electron microscopy (SEM) can be used to measure this dimension. Because the cross-sectional dimension usually is not precisely the same at all points of the matrix, an average is typically used as an appropriate measurement.

The term "acid stable" when referring to a matrix or polymer, or when referring to a linkage, means in the context of the present invention the polymer backbone is able to sustain useful membrane properties, or that the linkage remains intact, after exposure to at least one of the test exposure conditions set forth above.

The term "A value" in the context of the present application represents the water permeability of a membrane and is represented by the ratio of cubic centimeters of permeate water over the square centimeters of membrane area times the seconds at the pressure measured in atmospheres. An A value of 1 is essentially $10^{-5}$ cm$^3$ of permeate over the multiplicand of 1 centimeter squared of membrane area times 1 second of performance at a net driving pressure of one atmosphere. Unless noted otherwise, in the context of the present application, A values given herein have the following unit designation: $10^{-5}$ cm$^3$/(cm$^2$×sec×atm) or $10^{-5}$ cm/(sec×atm) at 25° C.

$A$=permeate volume/(membrane area*time*net driving pressure).

The term "flux" means the rate of flow of permeate through a unit area of membrane. It should be noted that under most circumstances the flux is directly related to the applied trans-membrane pressure, i.e., a membrane can provide a specific flux of permeate at a given pressure. This flux is often given in units of gfd.

The term "transmission value" means the solute concentration in the permeate divided by the average of the solute concentration in the feed and in the concentrate, expressed as a percentage [i.e. transmission value=permeate/((feed+concentrate)/2), expressed as a percentage]. The concentrate is the fluid that flows completely past, but not through, the membrane.

The term "retention value" means 100% minus the transmission value.

The term "recovery value" means the ratio of permeate fluid flow to feed fluid flow, expressed as a percentage.

The flux and retention values are measured when the membrane is operated in crossflow mode involving a 34-mil mesh spacer commonly used in the art with less than 5% recovery across the membrane sample or when operated with at least a fluid Reynolds number of 1000.

The term "gfd" means gallons per foot$^2$ per day, viz gallons/(foot$^2$×day). This is the flux rate at which permeate flows through the membranes.

The term "cation" means an ionized atom or molecular fragment that has a positive charge of at least one. The term "multivalent cation" means an ionized atom or molecular fragment that has a positive charge of at least two; these are typically metal atoms. Under these definitions, hydrogen (H$^+$) and hydronium (H$_3$O$^+$) ions are considered cations.

The term "net driving pressure" is equal to the average trans-membrane pressure minus the osmotic pressure difference between the feed and permeate.

The term "removing" means providing a retention value at the specified feed composition and operational conditions. Thus "removing at least 50% of the copper ions" means "providing at least 50% retention value of the copper ions".

The term "continuous spaces" means pores, void spaces, or free volume areas where the solutes can pass. These spaces can allow feed solution to pass the membrane without significant retention of the desired solutes.

The term "polysulfonamide" means a polymer comprising sulfonamide linkages in the polymer backbone. The term also includes polymers comprising sulfonamide linkages and other acid stable linkages in the polymer backbone. For example, a polysulfonamide can be prepared through the interfacial reaction of an amine monomer comprising two or more primary or secondary amine groups and a sulfonyl monomer comprising two or more sulfonyl halides.

The term "aliphatic" or "aliphatic group" is known in the art and includes branched or unbranched carbon chains which are fully saturated or which comprise one or more (e.g. 1, 2, 3, or 4) double or triple bonds in the chain. Typically, the chains contain from 1 to about 30 carbon atoms. In some embodiments, the chains contain from 1 to about 20 carbon atoms. In some embodiments the chains contain from 1 to about 10 carbon atoms. Representative examples include methyl, ethyl, propyl, isopropyl, pentyl, hexyl, propenyl, butenyl, pentenyl, propynyl, butynyl, pentynyl, hexadienyl, and the like.

"Alkyl" is a subset of aliphatic and is intended to include unsaturated linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Cycloalkyl is a subset of alkyl and includes cyclic hydrocarbon groups of from 3 to 8 carbon atoms. Examples of cycloalkyl groups include c-propyl, c-butyl, c-pentyl, norbornyl, adamantyl and the like.

The term "aryl" denotes a phenyl radical or an ortho-fused bicyclic carbocyclic radical having about nine to ten ring atoms in which at least one ring is aromatic. Representative examples include phenyl, indenyl, naphthyl, and the like.

The term "heteroaryl" denotes a group attached via a ring carbon of a monocyclic aromatic ring containing five or six ring atoms consisting of carbon and one to four heteroatoms each selected from the group consisting of non-peroxide oxygen, sulfur, and N(X) wherein X is absent or is H, O, ($C_{1-4}$) alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto. Representative examples include furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) quinolyl (or its N-oxide), and the like.

The term "heteroaliphatic" or "heteroaliphatic group" is known in the art and includes branched or unbranched carbon chains wherein the chain is interrupted with one or more (e.g. 1, 2, 3, or 4) non-peroxy oxygen, sulfur or nitrogen atoms. Typically, the chains contain from 1 to about 30 carbon atoms and from about 1 to about 10 heteroatoms. In some embodiments, the chains contain from 1 to about 20 carbon atoms and from about 1 to about 10 heteroatoms; in some embodiments, the chains contain from 1 to about 10 carbon atoms and from about 1 to about 5 heteroatoms. Representative examples include 2-methoxyethyl, 3-methoxypropyl, and the like.

The term "membrane is cationic" means that the membrane carries a net positive charge. This can be measured, for example, by streaming potential.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. Loweralkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include formyl, acetyl, propionyl, isobutyryl, t-butoxycarbonyl, benzoyl, benzyloxycarbonyl and the like. Lower-acyl refers to groups containing one to four carbons. Acylalkyl refers to a residue in which an acyl group is attached to an alkylgroup which is attached to the parent. An example would be $CH_3C(=O)CH_2$—. Such residues could also be characterized as "oxoalkyl" residues.

Arylalkyl means an aryl attached to the parent structure via an alkyl residue. Examples are benzyl, phenethyl and the like.

Substituted alkyl, aryl, cycloalkyl, heterocyclyl etc. refer to alkyl, aryl, cycloalkyl, or heterocyclyl wherein up to three H atoms in each residue are replaced with alkyl, halogen, loweralkyl, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy.

"Halogen" means fluorine, chlorine, bromine or iodine; "halo" means fluoro, chloro, bromo or iodo.

The term "monolithic NF membrane" refers to an NF membrane in which the NF layer is covalently bound to the underlying UF support, which in turn is optionally covalently bound to its support (e.g. a non-woven or woven support).

The following is a general discussion of the state of the art preceding the present invention:

In addition to the potential problems that can be caused by mechanical deformation as a result of action of hydrostatic pressures, the supports that are used for manufacturing MF, UF, PV and RO membranes are often made from polymers that swell or dissolve in organic solvents, acids and caustics, with the result that their mechanical properties are weakened in such streams. Examples of solvents that are used in industry but which may weaken or destroy polymeric membranes are: dimethylformamide (DMF), N-methylpyrrolidone (NMP), dimethylsulfoxide (DMSO), hexamethyl phosphoramide, sulfolane (tetramethylene sulfone), N,N-dimethylacetamide, acetone, hexane and other solvents. Swollen membranes are mechanically weaker under conditions of applied hydrostatic pressure and may undergo compaction deformation, loss of flux and resultant loss of performance.

Solvent stable UF/MF membranes are also described in the literature. An important group of membranes include those based on ceramic or other inorganic materials. Some examples of specialized membranes made from cross-linked polymers are also known in the art. The ceramic based membranes, however, are expensive, and available in only a very limited number of configurations with limited characteristics. Besides ceramics, membranes fabricated from cross-linked polymers such as epoxy polyimide type polymers and encapsulated polymers are also available. Encapsulated polymeric membranes are described in U.S. Pat. Nos. 4,778,596 and 6,086,764. These membranes are coated on the external surfaces and on internal porous surfaces with a cross-linked polymeric layer. The supporting UF membrane backbone is not, itself, cross-linked, but is however, encapsulated by means of an outer skin. Consequently, such membranes do not generally possess stability in organic solvents and upon immersion in aggressive solvents tend to swell and disintegrate.

Stability is not the only criterion for useful and effective membrane separation. Selectivity and optimized fluxes are generally essential for achieving the separation goal. In some applications very high retention of all small soluble molecules is required. In other applications separation between low molecular solutes from larger solutes is needed; thus selectivity is one of the parameters that must be achieved simultaneously with the chemical, compaction and temperature stabilities. At present, no single membrane type is available with all such properties that can provide an appropriate solution to all needed separations, and specific combination of properties must be tuned to achieve acceptable stability and separation selectivity. No membranes suit all applications. Some membranes that are needed in the separation field of ultrafiltration, nanofiltration, reverse osmosis, pervaporation, vapor permeation and catalysis are not available. Typical examples demonstrating limitations of the present membrane classes are given below.

Ceramic membrane supports have very good thermal stability exceeding 250° C. They are also known to have good solvent stability and stability against attack in oxidizing media. However, their pressure stability, particularly of their tubular configurations, is limited in many cases to 20-30 bars only, while standard polymeric membranes for reverse osmosis can withstand pressures of up to 70 and even 80 bars in spiral wound configuration and in plate and frame configuration may exceed 120 bars. The limited pressure stability of the currently available ceramic supports in tubular or capillary configurations is a serious limitation, that limits the use of NF or RO membranes made on such ceramic supports to streams with low concentrations of soluble matter that exert low osmotic pressures where low hydrostatic pressures provide a satisfactory solution.

In many cases the stability of ceramic membranes in harsh acidic or alkaline environments is inferior to the stability of some polymeric supports such as polyether ether ketone (PEEK), polyphenylene sulfone (PPSu) and even of polysulfone (PS) and polyethersulfone (PES). Ceramic nanofiltration membranes with tight molecular weight cutoff (MWCO~200 Daltons) are known and reported in the literature, but the selectivity between molecules of varying molecular weights is still limited and is inferior to the selectivity that can be achieved with a variety of polymeric thin film composite layers.

A class of hybrid ceramic polymeric membranes has been developed, allowing a variety of polymeric top layers to be coated onto ceramic UF supports. Such polymer layers may be endowed with a variety of important properties, such as stability, selectivity and permeability in various organic solvents (WO 99/40996). It will be appreciated that ceramic-polymeric hybrids extend the range of achievable selectivities and the range of solvent and chemical stabilities of the ceramic membranes but does not provide an adequate solution to their limited stability in strong acids and bases and limited pressure stability. Another common problem of the ceramic membranes is their brittleness and very high cost. These factors limit their use to only very special cases.

A wide range of polymeric membranes can be used for making UF, NF, RO, PV and MF membranes and membranes for separations of catalysts. Some of these membranes such as PES, PS, PPSu, PPS (Polyphenylenesulfide), PPO (Polyphenyleneoxide) have excellent stability under high applied pressure combined with good chemical resistance against attack in oxidizing media, but they lack stability in organic solvents. As mentioned above, a combination of solvent stability with a chemical stability in extreme pH conditions and in oxidizing environment is needed for many industrial and wastewater applications, however the combination of such properties is lacking in almost all currently available membranes.

Solvent resistant polymeric membranes for UF, NF & PV applications are known. Typical polymers for making solvent resistant membranes are made from cellulose, polyacrylonitrile or poly-imides. These membranes do not possess the required stabilities in strong acidic, alkaline and oxidizing media.

Cross-linked polyacrylonitriles disclosed in U.S. Pat. No. 5,032,282 are limited in their acid and base stability (pH range 2-12), their thermal stability and their resistance to oxidants.

Cross-linked PANGMA disclosed in U.S. Pat. No. 6,159, 370 has shown very good solvent stability and is reported to have some stability in acidic media but has limited stability in concentrated caustic conditions and in concentrated acids. This material also has limited resistance to oxidizing media.

Solvent resistant polyimides have been developed, as described in U.S. Pat. No. 5,067,970, but lack stability in extreme pH conditions. For example, some typical polyimides degrade in 10% NaOH in a period of few days.

Many polymers are useful for making asymmetric types of membranes. One drawback of currently available membranes from these polymers is their sensitivity to organic solvents. PAN, PVDF, PS, PES, PPSu and membranes thereof, swell and dissolve in many organic solvents such as acetone, toluene, n-butylamine, methyl chloride, methylethylketone, and the like. PAN membranes are also of limited use in presence of organic solvents since they tend to swell and dissolve in solvents such as DMFA, DMSO and NMP.

The patent literature includes many examples of modification procedures to overcome these disadvantages, including U.S. Pat. No. 6,159,370, U.S. Pat. No. 4,477,634, European Patent No. EP 0574957 and U.S. Pat. No. 5,032,282. However, such methods suffer from one or more disadvantages or limitations, such as a need for toxic and expensive reagents, and/or organic solvents, incomplete cross-linking and/or poor control over the extent of modification.

Other types of damage that can occur to multilayer membranes when used in harsh conditions is delamination, i.e. the separation between the different layers of the membrane due to their different degree of swelling and thus different degree of dimensional change. This causes adjacent layers to separate and imparts substantial damage to both the performance and working life of the membrane.

Solvent resistant membranes based on PAN and PVDF are known. They have been described in European Patent No. EP 0574957 and in U.S. Pat. No. 5,032,282. Stability of solvent resistant membranes can be achieved by chemical modification of the entire polymeric matrix of polyacrylonitrile or polyvinylidene fluoride and their subsequent surface cross-linking as is shown in the following description.

European Patent No. EP 0574957 states that PAN and PVDF membranes were cross-linked by immersion for 5 minutes in 1% wt/vol. sodium ethoxide, drained and then heated to 115° C. for 30 minutes. It is well known in the state of the art to perform such a reaction throughout the whole bulk of a polymer or membrane. There are many known polymeric products based on this approach, including ion exchange resins based on cross-linked polystyrene, electrodialysis membranes, epoxy resins and other similar materials.

Usually the formation of such cross-linked products is done by mixing chemically reactive monomers with cross-linking agents, initiators and other additives. The cross-linking reaction occurs in the entire bulk of a polymer and involves high bulk density of covalent cross-linking bonds. Such methods of making cross-linked polymeric products are suitable for imparting a desired combination of chemical and solvent stability properties to a final polymeric product.

However, such manufacturing methods for making cross-linked, chemically stable polymeric products are limited to a narrow range of membrane types, particularly for making flat homogenous membranes. Electrodialysis membranes of this type have a thickness of 0.1-0.2 millimeters and are essentially homogenous throughout their cross-section. These methods can also be used for making thin coatings on porous substrates such as top layers of NF, RO, PV and similar membranes types.

A major class of pressure driven membranes, such as MF, UF, NF, RO, PV and gas permeating membranes, have asymmetric structures and such membranes are made by a well known phase inversion process, in which a solution of a polymer in an organic solvent or solvent mixture is cast first as a flat layer and then immersed in a water bath, thereby imparting an asymmetric structure to the membrane.

There is very large class of polymers that can be cast into an asymmetric form in such a manner, mainly as MF or UF membranes, but sometimes as NF and RO membranes. The most well known are those made from PAN, PVDF, polyimide, polyamide, PS, PES, PPSu, cellulose, cellulose acetate and others. As mentioned, most of such membranes lack one or more commonly desired resistances, and desired combinations of stability properties such as chemical, oxidation, thermal and solvent stabilities have not hitherto been available, and certainly not at commercially viable prices.

Cross-linking methods based on development of special copolymers are usually complicated, involving difficult chemical reactions. In many cases special copolymers must be manufactured in order to insert into a chain of the main polymer, an appropriate chemically reactive group that is capable of performing a cross-linking chemical reaction throughout the polymer structure.

It will be appreciated that in order to perform a cross-linking reaction, a low MW cross-linker must penetrate into the bulk of a polymeric backbone and react with the reactive functional groups. An example of such a cross-linking method is a solvent stable membrane presented in U.S. Pat. No. 6,159,370 (Hicke et al.), wherein a method of manufacturing a polyacrylonitrile copolymer by reacting acrylonitrile with glycidylmethacrylate groups is described. A completely new polymer must be manufactured which is both complicated and costly. Such a polymer is first cast into an asymmetric membrane and subsequently cross-linked using ammonia as the cross-linker.

The complexity and costs of implementation of such a method are self-evident. Such an approach for making solvent and acid resistant membranes has several drawbacks:

(a) A new polymer must be synthesized from monomers, which is not a commercial process. This requires specialized synthetic facilities and results in a high cost raw polymer for making such membranes. It will be appreciated that the production of commercial quantities requires significant investment and is more expensive than purchasing commercially available polymers that are conventionally used for making membranes.

(b) A new casting formulation must be developed every time a new polymer is developed and synthesized.

(c) The cross-linking reaction is complicated and requires use of aggressive and poisonous reagents (gaseous ammonia) and reactors that have negative environmental effects.

(d) The reaction requires expensive equipment and can be carried out only in small production batches, again adding to the cost of the membranes produced by such an approach.

Direct modification of PAN by monomeric amines involves many difficulties. As is known, hydroxylamine can react in mild conditions with aliphatic, aromatic and polymeric nitriles by forming amidoxime groups at high conversion ("The Chemistry of the Cyano Group", F. C. Schaefer ed. Z. Rappoport, Interscience, New York, chapter 6, p. 239-305, (1970); "The Chemistry of Amidoximes and Related Compounds", F. Eloy and R. Lenaers, Chem. Rev., 62, p. 155, (1962)).

Polyacrylonitrile has been cross-linked throughout the whole membrane matrix by thermal methods (U.S. Pat. No. 5,039,421). In this case the increase of temperature, in a type of a pre-pyrolysis step, leads to a conversion of acrylonitrile groups into cyclical structures. While a highly cross-linked membrane was formed with very good solvent stability, the PAN backbone is vulnerable to decomposition at extreme acidic or alkaline conditions and to oxidants.

U.S. Pat. No. 4,477,634 describes a process for modifying PAN through a reaction of (a) hydroxylamine as a first step for converting acrylonitrile groups of PAN into amidoxime groups and (b) a polyfunctional ionic cyclic carbonic acid amide-halide (cyanuric acid) capable of reaction with the amidoxime groups. Only a partly cross-linked PAN membrane is formed, due to the low conversion of the nitrile groups of PAN to amidoxime. Only about a 20% conversion of the nitrile groups is obtained, even though the reaction is typically effected at 60° C.

Such a low conversion value demonstrates the difficulties of polymer modification under heterogeneous conditions. By using only the first step above, the nitrile groups are converted into amidoxime without imparting to the membrane any degree of cross-linking. The use of a second step is essential for cross-linking, since only then a reaction of the amidoxime groups with carbonic acid imide-halide forms covalent bonds, thereby imparting stability in solvents and acids to the membrane.

Such modification of membranes is carried out in two steps and involves a very difficult technological process using labile, toxic compounds. This is particularly true in respect of the second step of the process, which employs a 2% cyanuric chloride suspension at 0-5° C. It will further be appreciated that the high consumption of cyanuric chloride and large quantities of water create significant ecological problems, and dealing with this in an appropriate manner adds to the costs of production.

There are other possible methods for cross-linking polyacrylonitrile polymers. For example, it is known from the literature that the nitrile groups present can react with amine groups to produce an amidine ("The Chemistry of the Cyano Group" F. C. Schaefer ed. Z. Rappoport, Interscience, New York, chapter 6, p. 239-305 (1970)). However, these reactions require extreme reaction conditions such as high temperature, pressure, anhydrous solvents and catalysts.

Solvent resistant polyimides have been made by first casting polyamic acid and then heating. Solvent resistant polyimide membranes have been made by casting unsaturated polyimides, as described for example in European Patent No. EP 0 422 506 A1, Burgoyne, et al, which can be cross-linked through the double bonds by free radicals or ionizing radiation. Solvent stable membranes based on an aromatic polymer having a thio ether can be made by oxidizing the membrane, thereby making them insolubilized, as described in Nakashima et al, U.S. Pat. No. 5,272,657.

In some cases the cross-linking is achieved as a result of a complete change in the chemical nature of the starting polymer. For example, a cellulose derivative can become solvent resistant by hydrolyzing most of its acetate groups, thereby converting it to essentially insoluble regenerated cellulose.

This material can then be converted into a completely cross-linked structure by reacting with either a bi-functional or a multi-functional reactant.

In U.S. Pat. No. 5,282,971 (P. J. Degen, J. Lee, Pall Corp., Feb. 1, 1997), polyvinylidene fluoride MF membranes are positively charged on all their external and internal surfaces by exposing the membrane to ionizing radiation (gamma and electron radiation), which produces radicals on the membrane, and then contacting it with an aqueous solution containing vinyl monomers, at least some of which are cationically charged (most preferably using diallyldimethyl ammonium chloride), and non-ionic but polar monomers (e.g., HEMA). After irradiation and polymerization, the membrane is washed to remove polymer that is not bound to the membrane.

In U.S. Pat. No. 4,778,596 to Linder et al. (Oct. 18, 1988) a semipermeable membrane is formed by first coating by immersion all the external and internal surfaces with a coating polymer and then cross-linking this external coating polymer by immersion in another solution containing a cross-linker. The cross-linker diffuses into the coating and cross-links both external and internal coatings, however, membranes formed in this manner do not possess the stability in organic solvents necessary for many applications.

In U.S. Pat. No. 4,704,324 to Davis, composite membranes are formed by placing a thin layer of solution containing reactive cationic compound with a compound containing a nucleophilic moiety. The reaction product contains covalent bonds formed via charge elimination reactions and gives a cross-linked selective layer on the upper surface of a porous support. However, this method does not form a solvent stable membrane.

Accomplishing reactions of the amine groups with nitrile or halogen compounds of PVDF membranes is very difficult. An example of this can be found in results of research on the PVDF reactions with amines in vacuum, at temperature of 80° C. appearing in H. Schonhorn and J. P. Luongo, J. Adhesion Sci. Technol., Vol. 3, N4, pp. 227-290, (1989). There it was shown that amine and amide curing agents for epoxy resins serve a dual function. They react both with the fluoropolymer to modify the surface region and to cross-link the epoxy resin. This publication does not disclose any solvent and acid resistant surface modified PVDF polymer matrix.

It is also known that the cross-linking mechanism of diamines with VDF-based fluoro-polymers may proceed in three main steps: elimination of HF (dehydrofluorination) from VDF segments to generate internal double bonds; Michael addition of the diamine onto the resulting double bonds to form cross-links, and elimination of HF from the cross-links during post-cure, to form further double bonds.

The mechanism of cross-linking with diamine (for example for hexamethylenediamine) with a poly(VDF-co-HFP) copolymer is described in an article by A. Taguet, B. Ameduri and B. Boutevin, J. Adv. Polym. Sci., 184, p. 127-211 (2005). This mechanism occurs in the course of the press-cure treatment of polymer at 150-170° C., ~30 min. In a first step, the diamine dehydrofluorinates the VDF/HFP diad, creating a double bond. Then, by Michael addition, the diamine adds onto two CF=CH unsaturated backbones, creating bridges between polymeric chains. The CF=NH bonds are sensitive to the oxygen atmosphere and to heating, and submit to a further dehydrofluorination leading to a C=N bond that can degrade into a C=O bond.

Thus, reaction of the PVDF with amines in heterogeneous conditions cannot be controlled and cannot be stopped at a desirable stage. It can be reasonably assumed that the modification process occurs on the surface and not in the bulk of the polymeric film. By contrast, in the case of modification of the polymeric films and membranes on a PAN or PVDF basis by low molecular weight amines that provide new properties such as solvent and acid resistance, it can be assumed that bulk modification does occur.

Semi-permeable membranes have a long history of use in separating components of a fluid mixture such as a solution or a suspension. In the context of such separations, such membranes preferentially retain certain components while preferentially allowing other components to pass through the membrane. The components of the feed fluid that pass through the membrane are generally referred to as the "permeate" and those that do not pass through the membrane (i.e., are rejected by the membrane or are held by the membrane) are generally referred to as the "retentate". Depending on the specific application, the permeate, the retentate, or both streams may constitute or be enriched in the desired component(s), and may be used as obtained from the membrane, or may be subjected to further processing. In order to be economically viable, the membrane must provide sufficient flux (the rate of permeate flow per unit of membrane area) and separation (the degree to which the membrane is able to retain certain components while allowing others to pass through).

The degree of separation and permeate flux obtained in a membrane separation process are determined in large part by the general morphology of the membrane, together with its physiochemistry. Depending on the membrane formation technique employed, a given polymer type can be used to fabricate a wide variety of membranes including those with relatively large pores, those with smaller pores, or even those with pores sufficiently small that solute transport through the membrane is governed by the interactions among specific chemical functional groups in the membrane polymer and the feed components.

Semi-permeable membranes can be described by several different classifications. One method of classifying liquid permeating membranes is to refer to them as microfiltration (MF), ultrafiltration (UF), nanofiltration (NF), or reverse osmosis (RO) membranes. These classes are not based on any single exact, formal definition, but are nevertheless terms commonly used and understood in the membrane industry.

In general, the term "microfiltration membranes" refers to those membranes with pores having an average diameter of greater than about 0.1 microns. The upper pore size limitation of mictrofiltration membranes is not strictly defined, but can be considered to be about 10 microns. Materials with pore sizes larger than about 10 microns are generally not referred to as membranes. Microfiltration (MF) membranes are commonly used to retain small particulates and microbes. Typically, these membranes allow the permeation of smaller components, such as simple salts, dissolved organic materials having a molecular weight of less than about 100,000 and colloidal particles that have physical dimensions that are smaller than pores of MF membrane. MF membranes usually possess the highest water permeability of the four classes of membranes, due to their large pore diameters as well as their typical high pore density. The pure water permeability (A value) of these membranes is commonly greater than about 5,000 liter/(m$^2$×h×bar).

Ultrafiltration (UF) membranes typically are characterized by pore sizes of from about 0.1 micron to about 5 nanometers. UF membranes are commonly classified by their ability to retain specific-sized components dissolved in a solution. This is referred to as the molecular weight cut-off (MWCO). UF membranes are commonly used to retain proteins, starches, and other relatively large dissolved materials while allowing the permeation of simple salts and smaller dissolved organic compounds. The water permeability of UF membranes is commonly in the range of from about $A=100$ liter/($m^2$×h×bar) to about $A=5000$ liter/($m^2$×h×bar).

Nanofiltration (NF) membranes typically are defined as membranes which possess the ability to fractionate small compounds (i.e., those with molecular weights less than 1000). The small compounds are often salts, and NF membranes are commonly used to permeate monovalent ions while retaining divalent ions. NF membranes typically possess ionized or ionizable groups on their surfaces, including within the pores. Although not wishing to be bound by theory, it is believed that NF membranes can effect the separation of ionic materials through a charge-based interaction mechanism. NF membranes also can be used to separate uncharged organic compounds, sometimes in solvents other than water or to separate organic molecules from salts. The water permeability of NF membranes is commonly in the range of from about $A=1$ liter/($m^2$×h×bar) to about $A=10$ liter/($m^2$×h×bar).

Reverse osmosis (RO) membranes can retain all components other than the permeating solvent (usually water). Like NF membranes, RO membranes can contain ionic functional groups. RO membranes are commonly used to remove salt from water and to concentrate small organic compounds. The water permeability of reverse osmosis membranes is commonly in the range of from about $A=0.2$ liter/($m^2$×h×bar) to about $A=5$ liter/($m^2$×h×bar).

Although the mechanisms that govern membrane performance are not exactly defined, some basic theories have been postulated. A good review of some membrane transport theories can be found in The Solution Diffusion Model: A Review, J. G. Wijmans, R. W. Baker, J. Membrane Science, 1995, vol. 107, pp. 1-21, the contents of which are incorporated herein by reference.

It is generally believed that microfiltration and ultrafiltration operate via a pore flow model where the pores of the membrane sieve the components of the feed solution through primarily physical interaction. Chemical interactions between the chemical functional groups on the pore wall and the chemical functional groups of the feed solutions are believed to generally play only a minor role in governing separation by microfiltration and ultrafiltration membranes.

With regard to NF and RO membranes, the general belief is that these membranes effect separation through both physical and chemical interactions. It is believed that since the pore sizes of these membranes are so small—thought by some to be simply the void space between atoms or chains of atoms—large particles are retained by these membranes because they are physically too large to pass through the membranes. The transport of small components is thought to be governed in part by size-based sieving, as with MF and UF membranes, but also to be influenced by interactions between the membrane material and the solute. An NF membrane having an abundance of negatively charged functional groups, for example, will tend to preferentially retain multivalent anions over multivalent cations due to charge repulsion (while maintaining charge neutrality in both the permeate and the retentate). A membrane with a net positive charge will tend to retain multivalent cations over multivalent anions.

Membranes have also been used in other applications such as pervaporation and gas separation. Typically, in these applications, the membranes permeate gaseous rather than liquid materials. Some membranes used in RO and NF have been found to function suitably in pervaporation and gas separation.

In addition to the functional classification of liquid-filtering membranes as MF, UF, NF or RO, semi-permeable membranes also can be classified by their structure. Examples are symmetric, asymmetric, and composite membranes. Symmetric membranes are characterized by having a homogeneous pore structure throughout the membrane material. Examples of symmetric membranes are some MF membranes, many ceramic membranes, and track-etched microporous membranes.

Asymmetric membranes are characterized by a heterogeneous pore structure in at least part of the membrane material. Most commercially available UF membranes posses an asymmetric structure.

Composite membranes are defined as having at least one thin film (also sometimes called a matrix) layered on a porous support membrane. The pores of the thin film layer are usually smaller than those of the porous support membrane, which is commonly a polymeric UF or MF membrane. The thin film is usually a polymer layer of a thickness of less than about 1 micron. Composite membranes of this type are usually asymmetric, but not all asymmetric membranes are composite membranes. While many types of separations involving a wide range of feed solutions have been made possible through the use of semi-permeable membranes, some feed solutions contain substances that cause the degradation of the membrane or membrane performance and render the membranes impractical for separation of these feed solutions. A decline in performance can be caused by alterations in the morphology and/or the physio-chemical integrity of the membrane. For example, a feed solution can include substances that interact with membrane components to plasticize, dissolve or react with them chemically, thus degrading the membrane structure and/or function. Examples of substances that may degrade membrane components include acids, bases, oxidants, many organic solvents and the like. Thus solvents can often plasticize or dissolve membrane components.

The chemical mechanism of action of acids on various chemical functional groups is well known. Without wishing to be bound by theory, it is believed that the most useful definitions and descriptions of an acid are those referred to as a Lewis acid or a Brønstead acid. A Lewis acid is a compound that is capable of accepting electrons. The more colloquial usage of the term "acid" is that of a Brønstead acid, i.e. a compound that can donate one or more protons. Brønsted acids all exhibit Lewis acidity because the proton of a Brønsted acid is capable of accepting electrons. Examples of Brønsted acids include acids such as, for example, sulfuric acid, phosphoric acid, nitric acid, hydrochloric acid, and acetic acid. Similarly, examples of Lewis acids include boron trifluoride, aluminum trichloride, and iron trichloride.

Both Lewis and Brønsted acids are capable of promoting polymer degradations. In aqueous media, this process is often referred to as acid hydrolysis. When acids attack the polymers of a semi-permeable membrane, the degradation often is evidenced by an increase in permeate flow through the membrane, a decrease in solute rejection by the membrane, or a combination of changes in both of these performance properties. Significant changes in either of these properties can make the use of a membrane for separation impractical. Commonly, this type of performance degradation is observed when commercial polyamide nanofiltration (NF) and reverse osmosis (RO) membranes are utilized to process strongly acidic feeds. Although initially their performance may be sufficient to perform the desired separation, the performance rapidly deteriorates, i.e. within a short period of time operating under strongly acidic conditions, the membranes lose the ability to retain dissolved metals, such as, cations and/or organic compounds.

The use of nanofiltration membranes for separation of copper and other metals from metal-containing liquids is well known and documented in the technical and commercial literature. For example, copper is often leached from copper-containing ore using sulfuric acid. The copper may be recovered by a combination of solvent extraction (SE), ion exchange (IE) and electrowinning (EW), but the use of NF membranes to filter copper ions from copper-ion containing streams in such processes, either to improve the recovery of copper and/or to purify waste streams and/or to purify the acid for re-use, is known in the art. Thus, the use of nanofiltration membrane for concentrating copper from an acidic process stream prior to its recovery by a subsequent SE, or ion exchange (IE) and/or EW process, or for improving the yield of the process by filtering the acidic raffinate stream and recycling the filtered copper back into the process stream, is known in the art.

Typical processes in which NF/UF and MF membranes were used in copper and/or metal recovery are described in detail in the following patent publications: U.S. Pat. No. 5,116,511, U.S. Pat. No. 5,310,486, WO 94/27711, U.S. Pat. No. 5,476,591, WO 95/30471, U.S. Pat. No. 5,733,431, WO 99/023263, WO 00/50341, U.S. Pat. No. 6,156,186, U.S. Pat. No. 6,165,344, U.S. Pat. No. 5,961,833 and U.S. Pat. No. 6,355,175 (hereinafter collectively "the HW patents"). The disclosures of these and all other patent publications mentioned herein, as well as the disclosures of non-patent publications mentioned herein, are incorporated herein by reference.

Thus, for example, U.S. Pat. No. 5,116,511 describes an ion exchange process for recovering copper and other metal ions from acidic waste water; waste acid from this process may be filtered through "a semi-permeable membrane having micro-pore structure which prevents the passage of metal ions therethrough while allowing the passage of primary acid solution through the membrane."

U.S. Pat. No. 5,310,486 and the corresponding WO 94/27711 disclose the use of a nanofiltration membrane to filter metal-ion containing wastewater to remove the majority of ions therefrom, then passing the acidic permeate through metal-absorbing beads to remove any remaining metal ions from the permeate. The metal-containing retentate "is removed from the system for storage and/or disposal". The metal is not recovered, the emphasis being on purifying the acid sufficiently for re-use in IE/EW processes.

Similarly, U.S. Pat. No. 5,476,591 and the corresponding WO 95/30471 disclose a process for the removal of copper and other metal ions from waste water in metal leaching processes. The waste water is passed through a nanofiltration membrane, which "produces a concentrated metal ion-rich retentate which is prevented from passing through the membrane system and a permeate which readily passes therethrough. The concentrated retentate is removed from the system for storage and/or disposal while the permate (which has relatively low amounts of residual dissolved metals therein) is directed into a first treatment column for the removal of any additional/residual dissolved metals (e.g. metal ions) not removed by the nanofiltration system." Alternatively, acidic lixiviant from copper leaching may be passed through a nanofiltration membrane, and the copper-ion rich retentate may then be treated to recover the copper, using known techniques such as solvent extraction/electrowinning.

U.S. Pat. Nos. 5,733,431 and 6,165,344 disclose a method for removing solid wastes from an organic extractant-based solvent extraction (SX)/electrowinning (EW) copper processing system. A lixivant is initially applied to copper ore, followed by mixing of the copper-containing lixivant product with an organic extractant. The organic extractant (which contains extracted copper ions) is then contacted with an electrolyte solution. At least part of the remaining organic fraction after electrolyte contact is passed through a filtration membrane (either an ultrafiltration or microfiltration membrane, not a NF membrane) to remove solid wastes. The filtered organic fraction is then reused within the system, followed by electrowinning of the copper-containing electrolyte to recover purified copper. Alternatively, the organic extractant may be membrane-filtered after initial contact with the copper-containing lixivant product to remove solid wastes from the organic extractant.

U.S. Pat. Nos. 5,961,833 and 6,355,175 disclose a method for separating gold (or silver) ions from copper ions. Complexes of the metals with cyanide are formed in situ and then filtered at basic pH using a nanofiltration membrane; the copper complexes are retained in the retentate and the gold complexes pass through in the permeate.

U.S. Pat. No. 6,156,186 and the corresponding WO 99/23263 disclose various processes for separating and in some cases recovering multivalent ions from process streams in leaching processes. In some cases, the desired metal, such as copper, is filtered from a waste stream by nanofiltration and then recovered using a combination of either solvent extraction or ion exchange, followed by electrowinning. In other cases, a metal other than copper is present in the retentate and the copper is present in the permeate; the copper may then be recovered by a further filtration step.

WO 00/50341 discloses a process for making sulfuric acid. The acid may be further purified by a process that includes, inter alia, the removal of multivalent metal ions from the acid by nanofiltration. The metals may optionally be recovered by precipitation, electrolysis, ion exchange resins, cementation or solvent extraction.

U.S. Pat. No. 5,547,579 (Brown; Eco-Tec Limited) discloses a process for purifying acid by using a nanofiltration membrane in conjunction with an acid absorption unit.

U.S. Pat. No. 7,077,953 (Ranney; Harris Group, Inc.) discloses a process in which a nanofiltration unit is utilized to separate sugars from acid in sugar processing.

U.S. Patent Publication 2007/0125198 (Rossiter) uses a nanofiltration membrane clean up an acid process stream and to facilitate the recovery of copper in a continuous process that also uses ion exchange and SX/EW.

U.S. Pat. Nos. 6,835,295 and 6,733,653 (Jangbarwala; Hydromatix, Inc.) disclose a process which uses a NF membrane in an electrowinning apparatus—metal-ion containing solution is drawn from near the cathode, filtered, and the metal-ion enriched retentate is recirculated to increase Cu ion concentration in the apparatus. The permeate is discarded or processed separately. The use of an ion exchange column to recover Cu from semiconductor wafer fabrication is also discussed.

WO 03/035934 (Brown; Eco-Tec Limited) discloses a method for recovering acidic pickling solutions (from stainless steel finishing processes) containing peroxide and dissolved metal. Nanofiltration is used to separate metals from the solution; in order to reduce membrane susceptibility to hydrogen peroxide, the filtration is conducted at low temperature.

U.S. Pat. Nos. 5,587,083 and 5,858,240 (Twardowski; Chemetics International Company, Ltd.) discloses the nanofiltration of aqueous salt solutions to separate monovalent anions (such as chloride) from multivalent anions (such as chromate).

U.S. Pat. Nos. 5,458,781 and 5,158,683 (Lin, Ethyl Corporation) discloses the nanofiltration of aqueous bromide solutions to separate monovalent bromide from multivalent anions.

U.S. Pat. No. 6,843,917 (Gut et al.; Universite Claude Bernard Lyon) discloses a method for separating lanthanides and actinides by forming complexes of these atoms with chelators and then separating the complexes by nanofiltration.

U.S. Patent Publication 2003/0089619 (Jayasekera et al.) discloses a process for the electrowinning of copper, which involves the formation of copper-cyanide complexes followed by the separation of the complexes into copper and cyanide ions. The copper ions are recovered by electrowinning, and nanofiltration is used to recover the cyanide ions, which unlike multivalent ions present in the system pass through in the permeate.

U.S. Pat. No. 6,827,856 (Desantis et al.; Bracco Imagin S.p.A.) discloses the use of a polyamide NF membrane to filter copper ions and pass iodide in the permeate as part of the X-ray contrast agent production process U.S. Patent Publication 2008/0069748 (Lien et al.; HW Advanced Technologies, Inc.) discloses a process which uses a NF membrane to separate $Fe^{3+}/Fe_2O_3$ (retentate) from $Fe^{2+}/FeO$ (permeate, which is of interest to the inventors and recycled back into the system). Optionally the $Fe^{3+}$ ions may be complexed with a binder to increase their likelihood of being retained. Other "valuable metals" are from the retentate by EW and SX/IE.

U.S. Pat. No. 5,945,000 (Skidmore et al.; J.R. Simplot Company) discloses a process for purifying phosphoric acid by filtering crude phosphoric acid through a polyamide NF membrane to obtain purer phosphoric acid; by filtering at lower temperatures than was previously done, the life of the polyamide NFMs is reported to be lengthened.

U.S. Patent Publication 2008/0000809 (Wang et al.; GE Global Research) describes the use of an organic solvent-stable NF or RO membrane to filter a hydrocarbon feedstock to remove vanadium therefrom. Although the membranes are said to be "stable" to the solvent, no actual examples of such membranes or their synthesis are provided.

The NF membranes employed in the HW patents are polyamide NF membranes; many NF membranes known in the art are based on polyamides or polyamines (see, e.g. U.S. Pat. No. 5,152,901 (Hodgdon; Ionics, Incorporated)). There is no discussion in the HW patents of the stability, or lack thereof, of the NF membranes employed. However, it was subsequently found that the polyamide NF membranes degraded in the acidic environment and had to be replaced approximately every 3 to 6 months.

It is therefore preferable to use for the copper recovery from lixiviation solution NF membranes with high stability in acidic environments. Standard NF membranes are made from polyamides that lack the necessary stability and must be replaced every 3-6 months.

U.S. Pat. No. 7,138,058 (Kurth; GE Osmonics, Inc.) discloses an NF membrane that is reported to have a particular stability to sulfuric acid. The membrane is produced using an interfacial reaction of an amine and sulfonyl chloride to produce a polysulfonamide-based membrane. While providing an improvement over earlier polyamide type membranes, the sulfonamide membrane is difficult to produce, let alone to produce with the consistency required for commercial applications.

Platt et al., J. Membrane Science 239 (2004) 91-103 reported that two NF membranes made from melamine polyamine are more stable than two commercially available NF membranes in sulfuric acid.

U.S. Pat. Nos. 6,132,804 and 6,536,605 (Rice et al., Koch Membrane Systems, Inc.) describes an attempt to provide chemically stable membranes using polyamine and cyanuric chloride. The performance of the Koch membranes is highly disappointing and these membranes do not have the required chemical stability for use in aggressive process streams.

Another issue of importance in the copper recovery and metal recovery mining industry is the issue of copper recovery and copper losses. Copper recovery methods disclosed in the technical, patent and commercial literature, including many of the patent publication discussed above, achieve recovery rates of around 50%. U.S. Pat. No. 5,476,591 discloses a process in which a copper ore is treated with acidic lixiviant solution, which is then passed through a nanofiltration membrane to produce copper concentrate and acid permeate. In order to avoid precipitation of mineral salts (Ca, Mn, as sulfates), this process includes the addition of antiscalants. However, the maximum copper recovery achievable by operating in this manner is only about 50%. As a result the copper concentration increases from ~1100 ppm to about 2200 ppm only. The copper concentrate is usually extracted from the pregnant leach solution (PLS) by means of solvent extraction, and since about 300-500 ppm copper are usually left in the raffinate, this leads to a substantial loss of copper, in the range of 10-30%.

In addition, in cases in which copper is extracted by SE processes, it may be desired to recover copper from the raffinate stream. As the concentrate of extracted copper increases, the concentration of acid in the raffinate stream likewise increases. For example, if the concentration of copper in the pregnant leach solution (PLS) to be extracted is 2000-3000 ppm (corresponding to a pH of around 3-3.5), the pH of the resulting raffinate stream will be around 1.5-2. If the concentration of copper in the PLS is 10,000-20,000 ppm, the pH of the raffinate may be in the range 0.5-1. NF membranes which are currently used for copper recovery from raffinate streams, even those that are considered to be "acid stable", are not stable at such low pH's and have short operating lifetimes under these conditions, making their use for copper recovery from such raffinate streams economically prohibitive.

Polymeric membranes with stability toward acids are known. Examples of polymers that are relatively stable toward acids and can be used to prepare membranes include polyolefins such as, for example, polyethylene and polypropylene, polyvinylidene fluoride, polysulfones, polyethersulfone, and polyether ketones. However, when these polymers are used in a dense film capable of retaining a high degree of dissolved metal cations and/or organic compounds, they are unable to permeate acids effectively. Conversely, when these polymers are used to form more porous, less dense morphologies, the resulting polymeric membranes can transmit a high degree of the dissolved acids, but then the membranes are unable to effectively separate dissolved metal cations and/or organic compounds. In discussing polymers in the context of this application, it will be appreciated that polymers typically are identified by the chemical functional groups that are formed, or are used to form, the resulting polymer backbone. Polyamides, for example, are termed as such because those polymers typically are formed through amide bond formation (even though such polyamide polymers may have only a small amount of backbone that comprises amide linkages). As is understood by persons skilled in the art, it is the sum total of all the atoms and bonds in a polymer that are responsible for the performance of a given polymer. Similarly, sulfonamide polymers include sulfonyl compound residues having at least two sulfonyl moieties and amine compound residues having at least two amine moieties wherein the sulfonyl and amine moieties form at least some sulfonamide groups. The sulfonamide polymer contains at least some sulfonamide linkages in the backbone of the polymer. Other functional and/or nonfunctional linkages such as amide, ester, ether, amine, urethane, urea, sulfone, carbonate, and carbon-carbon sigma bonds derived from olefins may also optionally be present in the backbone.

The preparation and the utility of the membranes will now be demonstrated by means of the following non-limiting examples:

EXAMPLES

Example 1

PAN/UF support membranes (PAN-400 and PAN-50 purchased from CUT Membrane Technology GmbH & Co., Dusseldorf, Germany; and PAN-GMT-L1 purchased from GMT Membrantechnik GmbH, Rheinfelden, Germany) were modified by immersion in a 4% polyethylenimine (PEI) solution (2% PEI, MW=750,000; 2% PEI, MW=800) followed by heat-treatment in a reactor at 90° C. for 17 hrs. Then, the membranes were dried by air flow at 90° C. for 1 hr and finally washed.

The following test method was carried out:

Test Method

Membrane performance (permeability) was measured using a magnetically stirred test cell at a pressure of 1 bar supplied from a compressed nitrogen gas cylinder. The cell was a stainless steel cylinder having at its bottom a sintered stainless metal plate supporting the membrane. Reverse osmosis water (ROW) was introduced to the test cell and permeate was allowed to accumulate and measured versus time.

The result of modification of different commercial PAN/UF membranes is summarized in Table 1.

Table 1 demonstrates that the modification by PEI leads to a new UF membrane with a different membrane performance.

TABLE 1

| Type of commercial PAN/UF support membrane | Before modification Permeability (L/m2*h*bar)/ROW | After modification Permeability (L/m2*h*bar)/ROW |
|---|---|---|
| PAN-400 | 560 | 68 |
| PAN-50 | 154 | 17 |
| PAN-GMT-L1 | 109 | 11 |

Example 2

Membranes prepared in accordance with the procedure of Example 1 were placed in N-methylpyrrolidone for a period of 1 month. After this exposure, the membranes were removed and their performance was measured using the test method described in Example 1. The results for the membranes' performance are summarized in Table 2.

Table 2 demonstrates the solvent stability of the PEI modified UF membranes compared to the initial commercial membranes. After exposure to N-methylpyrrolidone, the non-modified commercial UF membranes dissolved, but the PEI modified UF membranes remained intact and maintained their performance.

TABLE 2

| | Permeability (L/m2*h*bar) ROW | | | |
|---|---|---|---|---|
| | Commercial UF membrane | | PEI modified membrane | |
| Membrane | PAN-GMT-L1 | PAN-400 | PAN-GMT-L1 | PAN-400 |
| Before the immersion in N-methyl-pyrrolidone | 109 | 560 | 11 | 68 |
| After the immersion in N-methyl-pyrrolidone for 1 month | Dissolved | Dissolved | 15 | 69 |

Example 3

A PAN-GMT-L1 UF support membrane was modified in accordance with the procedure of Example 1. The procedure was modified by using 4% PEI of low molecular weight (MW=800). The membrane was tested in accordance with the test method described in Example 1. The results are shown in Table 3.

Example 4

A PAN-GMT-L1 UF support membrane was modified in accordance with the procedure of Example 1. The procedure was modified by using 4% PEI of MW=25,000. The membrane was tested in accordance with the test method described in Example 1. The results are shown in Table 3.

Example 5

A PAN-GMT-L1 UF support membrane was modified in accordance with the procedure of Example 1. The procedure was modified by using 4% PEI of high molecular weight (MW=750,000). The membrane was tested in accordance with the test method described in Example 1. The results are shown in Table 3.

Example 6

A solvent stability test of PAN-GMT-L1 UF support membranes, modified in accordance with the procedures of Examples 1, 3, 4 and 5 was carried out by placing the membranes in organic solvents for a period of 1 week. After this exposure, the membranes were removed and their performance was measured using the test method described in Example 1, but using the organic solvents in which they were immersed instead of ROW.

The results for the membranes' performance are summarized in Table 3, which demonstrates the possibility of using different types of PEI (e.g. of MW=800, 25,000, 750,000) for membrane modification. As observed from Table 3, solvent resistant UF membranes can be achieved not only with PEI of low molecular weight but also with a higher molecular weight PEI. Using PEI with different molecular weights in the modification process influences membrane performance.

TABLE 3

| PEI modified PAN/UF Membrane | Permeability (L/m2*h*bar) | | | | | |
|---|---|---|---|---|---|---|
| | Before solvent treatment (ROW) | Solvent treatment | | | | |
| | | Ethanol | Acetone | Toluene | * | Hexane |
| Example1 PEI MW = 800/750,000(50:50) | 11 | 10 | 15 | 11 | 3 | 16 |
| Example3 PEI MW = 800 | 16 | 15 | 45 | 31 | 2 | 101 |
| Example4 PEI MW = 25,000 | 13 | 17 | 15 | 4 | 2 | 2 |
| Example5 PEI MW = 750,000 | 4 | 3 | 7 | 2 | 1 | 10 |

*N-methylpyrrolidone

Example 7

A PAN-GMT-L1/UF support membrane was modified by immersion in a 4% polyethylenimine (PEI) solution (2% PEI, MW=750,000; 2% PEI, MW=800) followed by a heat-treatment in a reactor at 90° C. for 17 hrs. Then the membrane was washed with ROW at room temperature for 1 hr and the membrane was dried by air flow at 90° C. for 1 hr, and then finally washed.

Example 8

Step 1

PAN-GMT-L1 UF membranes, modified according to the procedure of Examples 1 and 7, were placed in a 20% sulfuric acid solution at 90° C. for a period of 24 hours. After this exposure, the membranes were removed and their performance was measured using the test method of example 1.

Step 2

Thereafter the membranes of step 1 above, as well as PAN-GMT-L1 UF membranes modified according to the procedure of Examples 1 and 7 that did not undergo acid exposure, were placed in organic solvents for a period of 1 week. After this exposure, the membranes were removed and their performance was measured using test method of example 1 but using the above organic solvents.

The results for the membrane performance are summarized in Table 4, which demonstrates the results of differences in the drying process of the membrane preparation. As observed from Table 4, the membranes made according to Examples 1 and 7 in different solvents and after acid-treatment, are UF membranes which are solvent and acid stable. It can be concluded that the membrane that was dried immediately after immersion in PEI solution (Example 1) is denser then the second membrane (Example 7) and has a lower permeability.

TABLE 4

| PAN/UF Membrane | | Permeability (L/m2*h*bar) | | | | | |
|---|---|---|---|---|---|---|---|
| | | Before solvent treatment (ROW) | Solvent treatment | | | | |
| | | | Ethanol | Acetone | Toluene | * | Hexane |
| PEI modified PAN/UF membrane (Example1) | Without acid treatment | 11 | 10 | 15 | 11 | 3 | 16 |
| | With acid treatment | 8 | 11 | 14 | NT | 3 | 20 |
| PEI modified PAN/UF membrane (Example 7) | Without acid treatment | 21 | 23 | 88 | 64 | 2 | 110 |
| | With acid treatment | 12 | 24 | 75 | NT | 2 | 116 |

*N-methylpyrrolidone

Example 9

A PAN-GMT-L1 UF membrane was modified according to the procedure of Example 1, but was exposed to room temperature for 17 hrs instead of heat treatment in a reactor at 90° C. The results for the membrane's performance, measured in accordance with the procedure described in Example 6, as well as the results for the unmodified commercial membrane and the modified PAN-GMT-L1 membrane as produced in Example 1, are summarized in Table 5, which demonstrates the importance of the heat-treatment in a reactor at 90° C. for 17 hrs in the process of the membrane preparation. Table 5 shows that the membrane prepared according to Example 9 has a lower solvent stability as compared to the membrane prepared in Example 1 and dissolves after exposure to N-methylpyrrolidone, similar to the unmodified commercial PAN/UF support membrane.

TABLE 5

| PAN/UF Membrane | Permeability (L/m2*h*bar) | | | | | |
|---|---|---|---|---|---|---|
| | Before solvent treatment (ROW) | Solvent treatment | | | | |
| | | Ethanol | Acetone | Toluene | * | Hexane |
| PAN-GMT-L1 | 109 | 98 | 236 | 50 | Dissolved | 91 |
| PEI modified PAN/UF membrane (Example9) | 50 | 43 | 125 | 24 | Dissolved | 88 |
| PEI modified PAN/UF membrane (Example1) | 11 | 10 | 15 | 11 | 3 | 16 |

*N-methylpyrrolidone

Example 10

A PAN-GMT-L1 UF membrane was modified according to the procedure of Example 1, except that the heat-treatment in the reactor was carried out for 5 hours instead of 17 hours. This membrane was tested by the test method described in Example 1 and was found to have a permeability in ROW of 26 L/m2*h*bar, which indicates less cross-linking of the PAN UF membrane by PEI.

This membrane was then tested by the method described in Step 1 of Example 8 and found to have a permeability in ROW of 30 L/m2*h*bar. Finally, the membrane was tested by the method described in Example 2 and found to have a permeability in ROW of 31 L/m2*h*bar. These results demonstrate the stability of a membrane performance by showing the similar permeability in ROW after exposure to acid and solvent treatment. These results also demonstrate that the procedure described in this Example gives a solvent and acid stable UF membrane.

Example 11

A PAN-GMT-L1 UF membrane was modified according to the procedure of Example 1, except that the heat-treatment in the reactor was carried out for 32 hours instead of 17 hours. The resulting membrane performed similarly to the membrane in Example 1. These results demonstrate that the procedure described in this example provides a solvent and acid stable UF membrane

Example 12

A PAN-GMT-L1 UF membrane was modified according to the procedure of Example 1, except that the heat-treatment in the reactor was carried out for 72 hours instead of 17 hours. This membrane was tested by the test method described in Example 1 and found to have a permeability in ROW of 120 L/m2*h*bar. The membrane collapsed after being tested by the method described in Step 1 of Example 8. These results indicate that excessive heat-treatment time leads to a non-viable membrane.

Example 13

A PAN-GMT-L1 UF membrane was modified according to the procedure of Example 1. The procedure was modified by using 2% polyethylenimine (PEI) (1% PEI, MW=750,000; 1% PEI, MW=800) instead of 4% polyethylenimine (PEI) (2% PEI, MW=750,000; 2% PEI, MW=800). This membrane was tested by the test method described in Example 1 and found to have a permeability in ROW of 26 L/m2*h*bar, which indicates less cross-linking of the PAN UF membrane by PEI than the membrane of Example 1.

This membrane was tested by the method described in Step 1 of Example 8 and found to have a permeability in ROW of 54 L/m2*h*bar, and then tested by the method described in Example 2 and found to have a permeability in ROW of 37 L/m2*h*bar. These results demonstrate the stability of the modified membranes after treatment with solvents and acid.

Example 14

A PAN-GMT-L1 UF membrane was modified according to the procedure of Example 1, but modified by using 10% polyethylenimine (PEI) (5% PEI, MW=750,000; 5% PEI, MW=800) instead of 4% polyethylenimine (PEI) (2% PEI, MW=750,000; 2% PEI, MW=800). This membrane was tested by the method described above and found to have a permeability in ROW 150 L/m2*h*bar. This membrane collapsed after being testing by the method described in Step 1 of Example 8. The high permeability value and instability in acid indicate the non-viability for present purposes of the membrane by the process of this Example, due to excessive concentration of PEI.

Example 15

A PVDF-GMT-L9 UF support membrane purchased from GMT Membrantechnik GmbH, Rheinfelden, Germany was modified according to the procedure of Example 1. The membrane was tested in accordance with the test method described in Example 1. The results are shown in Table 6.

Example 16

A PVDF-GMT-L9 UF support membrane was modified according to the procedure of Example 7. The membrane was tested in accordance with the test method described in Example 1. The results are shown in Table 6.

Example 17

Membranes were prepared according to the procedure of Examples 15 and 16. These membranes were then tested by the method described in Example 6. The results for the membrane performance are summarized in Table 6, which demonstrates solvent stability of the new PEI modified UF membranes and also the effect of differences in the drying process in the membrane preparation.

Table 6 shows the performance of the membrane as made according to examples 15 and 16 in different solvents compared to commercial PVDF/UF support membrane. A commercial PVDF/UF support membrane shows a very high permeability in organic solvents that indicate their instability in the tested solvents. On the other hand, the new PEI modified UF membranes have a good stability in different organic solvents. In addition, a membrane dried immediately after immersion in PEI solution (Example 15) is denser then the second membrane (Example 16) and has lower permeability.

TABLE 6

| PVDF/UF Membrane | Before solvent treatment (ROW) | Permeability (L/m2*h*bar) Solvent treatment | | | |
|---|---|---|---|---|---|
| | | Ethanol | Acetone | Toluene | Hexane |
| PVDF-GMT | 2 | 818 | 543 | 3182 | 3864 |
| PEI modified PVDF-GMT membrane (Example 15) | 6 | 9 | 9 | 8 | 33 |
| PEI modified PVDF-GMT membrane (Example 16) | 16 | 21 | 45 | 23 | 36 |

Example 18

PES/UF support membranes (Nadir UP020 purchased from Microdyn-Nadir GmbH, Weisbaden, Germany, and Sepro PES-20 purchased from Sepro Membranes, Inc., Oceanside, Calif., USA) were functionalized by immersion in a solution of 5% (v/v) chlorosulfonic acid in glacial acetic acid at a room temperature for 1 hour. Then the membranes were washed by cool (0-5° C.) RO water for 30 min.

Example 19

PES/UF support membranes prepared according to Example 18 were modified and tested according to the procedures of Example 1. The result of modification of different commercial PES/UF support membranes is summarized in Table 7, which demonstrates that the modification by PEI gives a new UF membrane with a different membrane performance.

TABLE 7

| Type of commercial PES/UF support membrane | Before modification Permeability (L/m2*h*bar)/ROW | After modification Permeability (L/m2*h*bar)/ROW |
|---|---|---|
| Nadir UP020 | 77 | 6 |
| Sepro PES-20 | 118 | 8 |

Example 20

Membranes prepared according to the procedure of Example 19 were placed in acetone for a period of 1 week. After this exposure, solvent test stability for the PES membrane was carried out using the test method of Example 1 and permeabilities in ROW of 7 L/m2*h*bar and 8 L/m2*h*bar for a modified membrane formed using a Nadir UP020 support membrane and for a modified membrane formed using a Sepro support membrane, respectively, were found. A commercial unmodified PES/UF support membrane dissolved immediately after immersion in acetone. These results demonstrate the stability of the modified membranes in a solvent.

Example 21

Membranes prepared according to the procedure of Example 19 were placed in a 20% aqueous sulfuric acid solution at 90° C. for a period of 24 hours. After this exposure, the membranes were removed and their performance was measured using the test method described in Example 1. Permeabilities in ROW of 8 L/m2*h*bar and 10 L/m2*h*bar for a modified membrane formed using a Nadir UP020 support membrane and for a modified membrane formed using a Sepro support membrane, respectively, were found. These results demonstrate the stability of the modified membranes in the presence of acid.

Example 22

A Sepro PES-20/UF support membrane was functionalized by immersion in aqueous solution of 3% (w/v) ammonium persulfate and heated to 90° C. for 10 minutes. Then the membrane was washed by RO water for 30 min and immersed in a cooled (5-7° C.) aqueous solution of 0.1% (w/v) cyanuric chloride for 1 hour. The resulting membrane was washed in cooled RO water.

Example 23

A PES/UF support membrane prepared according to Example 22 was modified according to the procedure of Example 1. The finished membrane maintained its performance after immersion in acetone for 24 hours, as opposed to the commercial unmodified support membrane that dissolved within minutes after being immersed in acetone.

Example 24

A Sepro PES-20/UF membrane was functionalized by ozone oxidation for 5 min. Then the membrane was washed with RO water for 30 min and immersed in cooled aqueous solution of 0.1% (w/v) cyanuric chloride at 5-7° C. for 1 hour. The resulting membrane was rinsed in cooled RO water.

Example 25

A PES/UF support membrane prepared according to Example 24 was modified according to the procedure of Example 1. The finished membrane maintained its structural integrity after immersion in NMP for 4 hours, as opposed to a commercial unmodified support membrane that dissolved within minutes after immersion in NMP.

It will be appreciated that the PES membranes can be functionalized by other methods, such as those described in the following theoretical examples 26 and 27. The membranes thus formed are expected to have the same properties as the membranes formed in Examples 18-25.

Example 26

A PES/UF support membrane is treated in air by corona discharge equipment. Then the membrane was washed with RO water for 30 min, immersed in cooled aqueous solution of 0.1% (w/v) cyanuric chloride at 5-7° C. for 1 hour, and rinsed again in cooled RO water. The membrane thus prepared is modified according to the method described in Example 1.

Example 27

A PES/UF support membrane is placed vertically in the vacuum chamber of plasma equipment fitted with parallel electrode plates and evacuated to a base pressure lower than $2*10^{-5}$ mbar. Then ammonia gas is introduced at 15 cm$^3$/min into the chamber, and plasma treatment is performed for 20 min as described in Applied Surface Science, 253, Issue 14, 2007, P. 6052-6059, You-Yi Xu et al.

The resulting modified membrane, now having amine groups on the surface thereof is immersed in a cooled 5-7° C. aqueous solution of 0.1% (w/v) cyanuric chloride for 1 hour. The resulting membrane is washed in cooled RO water. The membrane thus prepared is modified according to the method described in Example 1.

Example 28

A monolithic solvent and acid resistant PVDF/UF membrane was prepared according to the following procedure. A non-woven polypropylene substrate (PP) was immersed in 934-0-1 Kunststoff-Haftprimer (primer for PP to make it reactive; Glasurit, Munster, Germany), for 1 min at room temperature, and then dried for 10 min at room temperature and for another 10 min at 70° C. After that, the PP was modified by immersion in a 2% polyethylenimine MW=800, followed by heat-treatment at 90° C. for 5 hrs. The PP was washed with ROW at room temperature for 1 hr and finally dried. Casting of a PVDF/UF membrane was carried out according to the procedure that was described in EP 0574957, followed by heat-treatment at 90° C. for 5 hrs. Preparation of the monolithic solvent and acid resistant PVDF/UF membrane on the integral PP substrate was completed according to the procedure of Example 1.

Examples 29-31 illustrate syntheses of compounds derived from halodiazines and halotriazines that may be used as halogenated di- or triazines in the preparation of membranes for use in accordance with embodiments of the invention.

Example 29

Preparation of Condensate of p-Anilinesulfonate and Dichlorotriazine 6 g of NaOH were dissolved in 150 ml of water that had been filtered through a reverse osmosis unit ("RO water") followed by addition of 0.15 mol of sulfanilic acid and adjusting the pH to above 12 by addition of NaOH as necessary. 50 ml of 3M NaOH were added to this solution of sulfanilic acid and the resulting solution was added to an aqueous suspension of 0.15 mol of cyanuric chloride and left in a magnetically stirred vessel for 4 h at a temperature of 4-7° C. at pH~10. The product, which precipitated from the reaction mixture, was washed with acetone and RO water prior to use.

Example 30

Preparation of Condensate of p-Anilinesulfonate and Dibromotriazine 6 g of NaOH are dissolved in 150 ml of RO water followed by addition of 0.15 mol of sulfanilic acid and adjusting the pH to above 12 by addition of NaOH as necessary. 50 ml of 3M NaOH were added to this solution of sulfanilic acid and the resulting solution was added to an aqueous suspension of 0.15 mol of cyanuric bromide and left in a magnetically stirred vessel for 4 h at a temperature of 4-7° C. at pH~10. The product, which precipitates from the reaction mixture, is washed with acetone and RO water prior to use.

Example 31

Preparation of Condensate of Two Substituted Triazole Groups with Amine Bridge

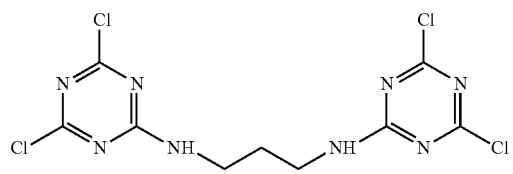 [SMILES: Clc1nc(Cl)nc(NCCCNc2nc(Cl)nc(Cl)n2)n1]

Step 1: 6 g of NaOH are dissolved in 150 ml RO water followed by addition of 0.15 mol of 1,3-diaminopropane and adjusting the pH to above 12. 50 ml of 3M NaOH were added to this solution of sulfanilic acid, and the resulting solution was then added to an aqueous suspension of 0.15 mol cyanuric chloride and reacted for 4 hours at a temperature of 4-7° C. at pH~10. The product, which precipitates from the reaction mixture, is washed with acetone and RO water.

Step 2: 6 g of NaOH are dissolved in 150 ml RO water followed by addition of 0.15 mol of the product from step 1 and adjusting the pH to above 12. Subsequently, an additional 50 ml of 3M NaOH and an aqueous suspension of 0.15 mol cyanuric chloride are added and reacted for a period of 4 h at temperature of 4-7° C. at pH~10. The product, which precipitates from the reaction mixture, is washed with acetone and RO water prior to use.

Example 32

Preparation of Non-Monolithic Membrane on a PS UF Support Membrane

A membrane suitable for use in accordance with embodiments of the invention was prepared in the following manner. A polysulfone ultrafiltration support membrane formed on a polypropylene nonwoven substrate supplied by FuMA Tech, termed "PES 006 cutoff" having a molecular weight cut-off (measured by the ASTM method at 90% dextran rejection) of 6000 Daltons was subjected to a cleaning step with RO water for 1 hour, then was rinsed with 0.3% solution of sodium dodecyl sulfate (SDS) and subsequently rinsed with RO water until no traces of SDS remained. The rinsed membrane was inserted into a pressure cell and contacted for 30 minutes at 10 bars with an aqueous reaction solution consisting of (a) a 0.125% aqueous solution of branched polyethylene imine (PEI) (Aldrich, $M_w$=750,000 as determined by gel permeation chromatography), and (b) a 0.075% aqueous solution of a condensate prepared from cyanuric chloride and sulfanilic acid as per Example 29. The excess modification solution was then drained, and the resultant membrane was removed from the pressure cell and heated at 90° C. for 30 min in a convection oven. After curing, the membrane was placed in a 20% aqueous ethanol solution containing 0.1% w/w of the condensate of cyanuric chloride and sulfanilic acid formed in Example 29. The solution was heated to 60° C. and the membrane was treated in this solution for a period of 1 hour in order to complete the cross-linking reaction step. After this reaction step the membrane was removed form the reaction vessel and rinsed in RO water for a period of 1 hour. After rinsing the membrane with RO water the membrane was placed in 20% solution of sulfuric acid in water at 90° C. for a period of 5 hours in order to hydrolyze all reactive chloro groups of the cyanuric chloride condensate. The membrane was removed from the acid, rinsed with RO water overnight, removed and subjected to a subsequent testing session.

Analogous membranes may be prepared, for example, by substituting cyanuric fluoride or cyanuric bromide for cyanuric chloride in the condensate with sulfanilic acid (e.g. by using the condensate product of Example 30 instead of the product of Example 29) or, for example, by using a condensate of two substituted triazole groups with an amine bridge (e.g. by using the condensate product of Example 31 instead of the product of Example 29).

Test Method 2:

Membrane performance (permeability and solute rejection) was measured using a magnetically stirred test cell at a pressure of 40 bar supplied from a compressed nitrogen gas cylinder. The cell was a stainless steel cylinder having at its bottom a sintered stainless metal plate supporting the membrane. For the permeability measurement, reverse osmosis water (ROW) was introduced to the test cell and permeate was allowed to accumulate and measured versus time. For the solute (glucose) rejection measurements, the test cell was filled with a 5% solution of glucose in water. The permeate was allowed to accumulate and its glucose concentration was measured by means of refractometry.

Afterwards the membrane was placed in a 20% sulfuric acid solution at 90° C. for a period of 180 hours. After this exposure, the membrane performance was tested again. The rejection (calculated according to accepted procedures known to those skilled in the membrane field) of glucose before sulfuric acid immersion was 97.5% and after immersion was 98%. Water flux before sulfuric acid immersion was 800 liters/m$^2$*day, and after the prolonged immersion in hot acid it was 950 liters/m$^2$*day. These results demonstrate superior stability of the NF membrane in acid conditions.

Example 33

The membrane and test procedure were repeated as in Example 32, this time increasing the immersion time of the membrane in 20% sulfuric acid at 90° C. from 180 hours to 360 hours. The measured rejection after 360 hours was 40% and the flux was 1700 liters/m$^2$*day. This result indicates that while membranes prepare per Example 29 exhibit significant stability in acid, this stability is limited in time.

Example 34

A monolithic NF membrane (i.e. in which the NF matrix is covalently bound to the UF support membrane, and the UF layer is covalently bound to its substrate) having dimensions of 30 cm by 25 cm was prepared from a UF support membrane having cross-linked polyacrylonitrile. PAN UF membranes were prepared according to the procedure described in Example 1.

To prepare an NF membrane for use in accordance with embodiments of the present invention, these modified UF membranes containing active amino groups were then coated by doctor knife with predetermined slit thickness of 50 microns, using a reactive coating solution containing 0.1% of PEI (Example 32 above) and containing a similar concentration of a condensate of cyanuric chloride with sulfanilic acid as described in Example 29 above. After coating, the membrane was completely dried in air and immersed for a curing step in an oven at 90° C. for 1 hour. After this step the membrane was immersed in a 20% aqueous ethanol solution containing 0.02% w/w of the condensate of cyanuric chloride and a sulfanilic acid of Example 29. The solution was heated to 60° C. and the membrane was treated in this solution for a period of 1 hour in order to complete the cross-linking reaction step.

The membrane was then immersed in 20% sulfuric acid at 90° C. for a period of 340 hours and its performance was tested periodically during this period. As shown in FIG. 8A, the rejection to glucose remained in the range of 95-99%, and the fluxes increased during this period from ~1000 liters/m$^2$*day to ~2000 liters/m$^2$*day, without any adverse affect on the rejection.

Example 35

A monolithic NF membrane was prepared as described in example 34 above, but utilizing as UF support membrane a cross-linked polyvinylidenefluoride (PVDF) membrane prepared in accordance with Example 15. The NF membrane was then immersed in a 75% concentrated sulfuric acid at 60° C. for a period exceeding 1100 hours. In addition, a commercially available polysulfonamide acid-stable NF membrane (KH membrane purchased from Osmonics, Inc., Minnetonka, Minn., USA) was immersed in the same solution and tested periodically. The results are shown in FIG. 8B. The KH membrane had an initial rejection of glucose of 98%, but after about 200 hours the rejection declined to ~80% and after an additional 200 hours the rejection dropped to 70%, showing its instability in such conditions. In contrast, the monolithic NF membrane maintained high rejection throughout the entire testing period, with fluxes stabilizing around 1500 liters/m$^2$*day.

Example 36

Separation of Metal Ions from Acidic Feed Stream

A membrane prepared according to example 35 was rolled into a spiral wound element 2.5 inches in diameter and 14 inches in length and then assembled into a pressure vessel. The pressure vessel was installed in a test system equipped with a feed vessel of 20 liters, a pump providing a circulation flow rate of up to 20 liters/minute and a pressure of up to 40 bars. The feed tank was filled with copper-containing acid leachate provided by a copper mine in Chile. The concentrations of the main metal ions (copper, aluminum and iron) were measured and are reported in Table 8. The pH of the stream was ~1. The stream was circulated under pressure allowing permeate to pass across the membrane. The volume of the feed stream was maintained at 20 liters using fresh feed. A total of 80 liters of feed water were processed, so that this volume was concentrated 4-fold to a volume of final concentrate of 20 liters. Thus the volumetric concentration factor (VCF) was 4. The copper concentration in the concentrate and in the permeate was measured by ICP spectrometry by an external laboratory. The results are shown in Table 8.

TABLE 8

| Composition of feedwater | Concentration in ppm | | | Copper rejection % | Flux Liters/m$^2$*day |
|---|---|---|---|---|---|
| | Feed | concentrate | Permeate | | |
| Cu | 450 | 1840 | 1.6 | 99.9% | 480 |
| Al | 30 | | 0.04 | | |
| Fe | 2 | | 0 | | |

As observed, very high copper retention was demonstrated in these tests. The experiment continued by circulating the concentrate in a closed loop for a period of 4 weeks in order to observe any change in performance. The results after 4 weeks of operation remained practically unchanged.

Example 37

Preparation of High Flux NF Membranes Using Reactive Dyes

A monolithic High Flux NF membrane sample having dimensions of 30 cm by 25 cm was prepared starting from a cross-linked polyacrylonitrile (PAN) UF support membrane, the preparation of the PAN UF support membrane is described in Example 1 above. To prepare the NF membrane, the UF membrane, which contained active amino groups, was immersed in an aqueous solution of 1% dye of Formula I shown below and 10% sodium chloride for 15 min and then in 5% solution of $Na_2CO_3$ for 20 minutes. This resulted in a modified UF membrane that served as a support for the subsequent NF layer. The NF layer was formed by coating the modified UF membrane, using a doctor knife having a slit thickness of 50 microns, with a reactive aqueous polymer solution containing 0.1% PEI and an equal concentration of a condensate of cyanuric chloride with sulfanilic acid, prepared as described in Example 29 above. The coated membrane was dried in air and then cured for 1 hour in an oven at 90° C. After this step the membrane was immersed in a 20% aqueous ethanol solution containing 0.02% w/w of the condensate of cyanuric chloride and a sulfanilic acid and heated for 1 hour at 60° C. The membrane samples were tested by Test Method 2. The water flux was 1800 liters/m²*day and glucose rejection was 98%.

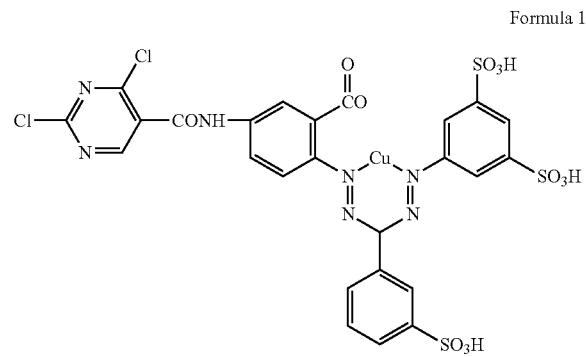

Formula 1

Example 38

Solvent Stability of NF Membranes Made Using Reactive Dyes

A membrane prepared according to the procedure of Example 37 was tested in a 5% aqueous glucose solution and immersed in N-methylpyrrolidone for a period of 8 days. After this exposure, the membrane was removed, washed in RO water for 24 hours and tested as described in Test Method 2. The glucose rejection before the immersion in organic solvent was 98.6% and remained high after immersion at a level of 98%. Water flux before organic immersion was 1800 liters/m²*day (LMD), and after the immersion in organic solvent it was 1400 liters/m²*day.

Example 39

Solvent Stability of Monolithic PAN Membrane

Several membrane samples that were prepared according to the procedure of Example 34 were tested in a 5% aqueous glucose solution. Afterward the membranes were immersed for different time periods in several organic solvents, such as N-methylpyrrolidone (NMP), dimethylformamide (DMF) and acetone. After the exposure, the membrane was removed, washed in RO water for 24 hours and tested as described in Test Method 2. The results of the membrane performances are summarized in Table 9. The results demonstrate high stability in presence of organic solvents.

TABLE 9

| INITIAL PERFORMANCE | | SOLVENT TREATMENT | | | | |
|---|---|---|---|---|---|---|
| Water flux (LMD) | Glucose 5% Rejection | Solvent type | Temp, ° C. | Exposure Time, day | Water flux (LMD) | Glucose Rejection |
| 1505 | 98.3 | NMP | RT | 13 | 1200 | 98.4% |
| | | NMP | RT | 304 | 1450 | 98.2% |
| | | DMF | RT | 300 | 1420 | 98.1% |
| | | Acetone | RT | 300 | 1470 | 99.0% |

Example 40

Alkaline Stability of Monolithic PAN Membrane

Several membrane samples that were prepared according to the procedure of Example 34 were tested in a 5% aqueous glucose solution. Afterward the membranes were immersed for different time periods in 10% and 20% NaOH solutions respectively. The membranes were tested according to the Test method. The results of the membrane performances after exposure are summarized in Table 10 (performance before exposure was similar to that shown in Table 9).

TABLE 10

| NAOH TREATMENT, RT | | | |
|---|---|---|---|
| conc. NaOH, % | Exposure Time, hours | Water flux (LMD) | Glucose Rejection |
| 10 | 18 | 1300 | 99.0% |
| 10 | 42 | 1520 | 98.5% |
| 20 | 48 | 1300 | 99.0% |

Example 41

Preparation of NF Membranes on Polyethersulfone (PES) (Monolithic and Non-Monolithic)

A. An NF membrane was prepared according to the procedure of Example 32, but a polyethersulfone (PES) UF support membrane (Microdyn Nadir UP020) was used instead of a polysulfone (PS) support membrane.

B. A monolithic NF membrane (30 cm by 25 cm) in which the NF top layer is covalently bound to the underlying PES UF support membrane, containing covalently bound amino groups, was prepared from an underlying PES support membrane that itself was prepared as described in Example 19. Specifically the PES UF membrane was prepared by modifying a commercially available PES UF membrane by first functionalizing it by immersion in a 5% (v/v) solution of chlorosulfonic acid in $CHCl_3/CCl_4$ (1:1) at room temperature for 1 hour. The membrane was then washed with cool (0-5° C.) RO water for 30 min. The resulting UF membrane was further modified as described in Example 1, viz. by immersion in a 4% aqueous PEI solution (2% PEI, MW=750,000, 2% PEI MW=800) followed by heat-treatment in a reactor at 90° C. for 17 h, followed by drying under air flow at 90° C. for 1 h and washing with RO water.

This UF support membrane was then coated by a doctor knife with a 50 micron thick layer of a reactive polymer solution containing 0.1% of PEI and an equal concentration of a condensate of cyanuric chloride with sulfanilic acid prepared as described in Example 29 above. After coating, the membrane was dried in air and subsequently cured for 1 hour in an oven at 90° C. After this step the membrane was immersed in a 20% aqueous ethanol solution containing 0.02% w/w of the condensate of cyanuric chloride and a sulfanilic acid. The solution was heated to 60° C. and the membrane was treated in this solution for a period of 1 hour.

Example 42

Acid Stability of PES Membranes (Monolithic and Non-Monolithic)

NF membranes prepared as described in Example 41 were immersed in a 20% sulfuric acid at 90° C. for a period of 1-20 hours. These membranes were tested as described in Test Method 2. The results of the membrane performances are summarized in Table 11, demonstrating superior acid stability of the monolithic NF membrane compared to that of the NF membrane in which the top layer is not covalently bound to the underlying UF support membrane.

TABLE 11

| Membrane preparation | Performance after 20% $H_2SO_4$ treatment, 90° C. | | |
|---|---|---|---|
| | Acid exposure time, hours | Water flux (LMD) | Glucose 5% Rejection |
| Example 41A | 1 | 450 | 95% |
| | 18 | 2650 | 75% |
| Example 41B | 1 | 950 | 94% |
| | 20 | 1710 | 94% |

Example 43

Alkaline Stability of Monolithic PES Membranes

Several membranes prepared in accordance with the procedures of Examples 41A and 41B were immersed for different durations in a 4% NaOH solution. These membranes were tested as described in Test Method 2. While the monolithic membrane (41B) maintained initial performance after alkaline immersion for a period of 7 days, the standard non-monolithic membrane (41A) showed a decline in glucose rejection values from an initial value of 95% to 75% after 7 days.

Example 44

Preparation of Non-Monolithic NF Membrane on a PAN UF Support Membrane

A PAN-GMT-L1 UF support membrane was treated with a 10% aqueous solution of sodium hydroxide at 50° C. for 15 minutes, washed well with water and heated for 15 minutes at 110° C. in a high boiling solvent such as glycerol. Afterward, the membrane was washed with RO water. It was coated, using a doctor knife having a slit thickness of 50 microns, with a reactive polymer solution containing 0.1% of PEI and an equal concentration of a condensate of cyanuric chloride with sulfanilic acid, prepared as described in Example 29 above. The coated membrane was dried in air and subsequently cured for 1 hour in an oven at 90° C. After this step the membrane was immersed in a 20% aqueous ethanol solution containing 0.02% w/w of the condensate of cyanuric chloride and a sulfanilic acid. The solution is heated to 60° C. and the membrane was treated in this solution for a period of 1 hour.

It will be appreciated by persons skilled in the art that the present invention is not limited to what has been particularly shown and described hereinabove. Rather the scope of the present invention includes both combinations and subcombinations of various features described hereinabove as well as modifications thereof which would occur to a person of skill in the art upon reading the foregoing description and which are not in the prior art.

The invention claimed is:

1. A polymeric semipermeable membrane comprising a non-cross-linked base polymer having reactive pendant moieties, said base polymer being modified by forming a cross-linked skin onto a surface thereof, said skin being formed by a cross-linking reaction of reactive pendant moieties on said surface with a cross-linking oligomer or another polymer thereby, said base polymer is covalently bonded to said oligomer or another polymer; wherein said base polymer is polyacrylonitrile (PAN) such that at least one portion of said cross-linked skin of said base polymer is covalently bonded to a nanofiltration layer by immersion of said cross-linked skin of said base polymer in polyethylenimine (PEI) and condensate solution comprising cyanuric chloride and sulfanilic acid thereby, said polymeric semipermeable membrane having acid and organic solvent stability; said nanofiltration layer comprises (i) at least one di-, tri- or tetra-halo substituted diazine or triazine-containing monomer, oligomer or polymer, and (ii) at least one multifunctional amine having a molecular weight in the range of 400 to 750,000.

2. The polymeric semipermeable membrane according to claim 1, wherein additionally comprising a woven or non woven substrate underlying said base polymer.

3. The polymeric semipermeable membrane according to claim 1, wherein said base polymer is selected from polyacrylonitrile and copolymers thereof.

4. The polymeric semipermeable membrane according to claim 1, wherein said another polymer is selected from polyethylenimine and polyvinyl alcohol.

5. The polymeric semipermeable membrane according to claim 1, wherein said polymeric semipermeable membrane is an ultrafiltration membrane or a microfiltration membrane.

6. A nanofiltration (NF) membrane having stability in acid and organic solvents, said NF containing a matrix that has been formed from a solution comprising PEI and a condensate comprising cyanuric chloride and sulfanilic acid; said matrix was dried at elevated temperature thereby, forming a matrix comprising (i) at least one di-, tri- or tetra-halo substituted diazine or triazine-containing monomer, oligomer or polymer, and (ii) at least one multifunctional amine having a molecular weight in the range of 400 to 750,000.

7. The NF membrane of claim 6, wherein said matrix has been formed on an underlying ultrafiltration or microfiltration membrane.

8. The NF membrane of claim 7, wherein the underlying membrane is a modified ultrafiltration membrane by forming a cross-linked skin onto a surface thereof; said modified ultrafiltration is covalently attached to a support material.

9. The NF membrane of claim 8, wherein the support material is a non-woven support material.

10. The NF membrane of claim 6, wherein said diazine or triazine-containing monomer or oligomer is selected from the group consisting of:

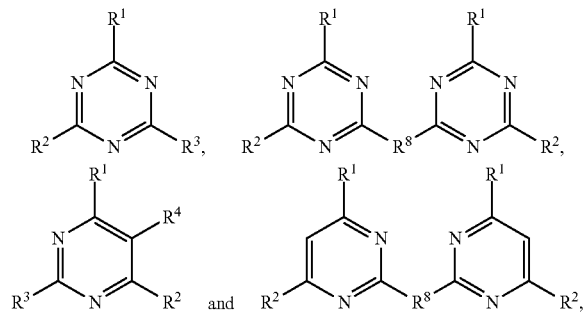

wherein:
- $R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;
- $R^2$ is independently selected at each occurrence from bromo, chloro and fluoro;
- $R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;
- $R^4$ is selected from H, bromo, chloro, fluoro, —$NHR^5$, —$OR^5$ and $SR^5$, wherein $R^5$ is independently selected at each occurrence from H, optionally substituted alkyl and optionally substituted aryl; and
- $R^8$ is independently at each occurrence —NH-A-NH—, wherein A is selected from $C_{1-20}$ aliphatic moieties, $C_{6-10}$ aromatic moieties, and combinations thereof; provided that at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

11. The NF membrane of claim 6, wherein said multifunctional amine has a molecular weight of in the range of 400 to 250,000.

12. The NF membrane of claim 6, wherein said matrix is formed by a process which comprises providing an asymmetric base ultrafiltration membrane which at one face thereof has pores of smaller diameter than at the opposite face; providing a solution containing at least one di-, tri- or tetra-halo substituted diazine or triazine-containing monomer, oligomer or polymer, at least one multifunctional amine having a molecular weight in the range of 400 to 750,000; and bringing the solution into contact with the face of the ultrafiltration membrane having smaller pores under superatmospheric pressure for a time sufficient to effect covalent bonding of the at least one di- or tri-halo substituted diazine or triazine-containing monomer, oligomer or polymer and the at least one multi-functional amine.

13. The NF membrane of claim 12, wherein said solution further comprises at least one supplemental cross-linker.

14. The NF membrane of claim 12, wherein prior to said contacting, said ultrafiltration membrane has been modified to facilitate covalent bonding to the surface thereof.

15. The NF membrane of claim 12, wherein, prior to said contacting, the ultrafiltration membrane was modified by forming a cross-linked ultrafiltration skin on the surface thereof, on which the matrix is then formed.

16. The NF membrane of claim 12, wherein the formation of the matrix further comprises, after said contacting, heating said ultrafiltration membrane.

17. The NF membrane of claim 12, wherein said multifunctional amine is selected from the group consisting of polyethylenemine, polyvinylamine, polyvinylanilines, polybenzylamines, polyvinylimidazolines, and amine-modified polyepihalohydrins.

18. The NF membrane of claim 13, wherein said supplemental cross-linker is selected from the group consisting of 2,4,6-trichloro-s-triazine, 4,6-dichloro-2-sodium p-sulfoanile-s-triazine (4,6-dichloro-2-p-anilinesulfonic acid sodium salt-s-triazine), 4,6-dichloro-2-diethanolamine-s-triazine and 4,6-dichloro-2-amino-s-triazine.

19. The NF membrane of claim 6, wherein said matrix has a density of from about 0.5 g per $cm^3$ to about 2.0 g per $cm^3$.

20. The NF membrane of claim 6, wherein the mass to area ratio of said matrix is from about 20 to about 200 mg/$m^2$.

21. The polymeric semipermeable membrane according to claim 1, wherein said base polymer is preferably polyacrylonitrile.

22. The polymeric semipermeable membrane according to claim 1, characterized by having improved stability in an aggressive environment comprising at least one organic solvent.

23. The nanofiltration membrane according to claim 6, wherein after further exposure of said NF membrane to 75% sulfuric acid at 60° C. for 1000 hours, said NF membrane exhibits a glucose rejection of at least 95% at a flux of at least 10 gfd.

24. The nanofiltration membrane according to claim 6, wherein after further exposure of said NF membrane to 20% sulfuric acid solution at 90° C. for 180 hours, said membrane exhibits a glucose rejection of 98% at a flux of 950 liters/m*day.

25. A polymeric semipermeable membrane having solvents and acids stability, prepared by steps of:
a. providing a UF base polymer comprising a cross linked polyacrylonitrile (PAN) containing active amino groups;
b. providing a solution comprising polyethylenimine (PEI) and condensate; said condensate comprising cyanuric chloride and sulfanilic acid;
c. immersing said PAN in said solution comprising PEI and condensate, thereby, covalently bonding a Nanofiltration (NF) layer with said UF base polymer; said NF comprising (i) at least one di-, tri- or tetra-halo substituted diazine or triazine-containing monomer, oligomer or polymer, and (ii) at least one multifunctional amine having a molecular weight in the range of 400 to 750,000;
d. curing said membrane by drying at elevated temperature.

26. The polymeric semipermeable membrane claim 25, wherein said elevated temperature is in the range of 50-100° C.

27. The polymeric semipermeable membrane claim 25, wherein said polyethylenimine (PEI) solution has a concentration between 2%-10%.

* * * * *